(12) United States Patent
Kuhn

(10) Patent No.: US 8,624,771 B2
(45) Date of Patent: Jan. 7, 2014

(54) WIRELESS CONNECTIVITY IN A RADAR DETECTOR

(75) Inventor: John Kuhn, Cincinnati, OH (US)

(73) Assignee: Escort Inc., West Chester, OH (US)

( * ) Notice: Subject to any disclaimer, the term of this patent is extended or adjusted under 35 U.S.C. 154(b) by 0 days.

(21) Appl. No.: 12/578,377

(22) Filed: Oct. 13, 2009

(65) Prior Publication Data

US 2010/0214149 A1 Aug. 26, 2010

Related U.S. Application Data

(63) Continuation-in-part of application No. 12/389,978, filed on Feb. 20, 2009.

(51) Int. Cl.
*G01S 7/42* (2006.01)

(52) U.S. Cl.
USPC .................................................... 342/20

(58) Field of Classification Search
USPC .................................................... 342/20
See application file for complete search history.

(56) References Cited

U.S. PATENT DOCUMENTS

| | | | |
|---|---|---|---|
| 3,793,635 A | 2/1974 | Potter | |
| 4,025,920 A | 5/1977 | Reitboeck et al. | |
| 4,492,952 A | 1/1985 | Miller | |
| 4,539,642 A | 9/1985 | Mizuno et al. | |
| 4,581,769 A | 4/1986 | Grimsley et al. | |
| 4,631,542 A | 12/1986 | Grimsley | |
| 4,876,527 A | 10/1989 | Oka et al. | |
| 4,954,828 A | 9/1990 | Orr | |
| 4,986,385 A | 1/1991 | Masaki | |
| 5,038,102 A | 8/1991 | Glasheen | |
| 5,049,885 A | 9/1991 | Orr | |
| 5,058,698 A | 10/1991 | Yoshida et al. | |
| 5,079,553 A | 1/1992 | Orr | |
| 5,083,129 A | 1/1992 | Valentine et al. | |
| 5,127,487 A | 7/1992 | Yamamoto et al. | |
| 5,134,406 A | 7/1992 | Orr | |
| 5,146,226 A | 9/1992 | Valentine et al. | |
| 5,151,701 A | 9/1992 | Valentine et al. | |
| 5,153,512 A | 10/1992 | Glasheen | |

(Continued)

FOREIGN PATENT DOCUMENTS

| | | |
|---|---|---|
| JP | 9027096 A | 1/1997 |
| WO | 97/08839 A2 | 3/1997 |
| WO | 00/29869 A1 | 5/2000 |

OTHER PUBLICATIONS

Murakami Shinichi, Speed Excess Alarming Device, Abstract, Japanese Publication No. 09-027096, Published Jan. 28, 1997.

(Continued)

*Primary Examiner* — Timothy A Brainard
(74) *Attorney, Agent, or Firm* — Wood, Herron & Evans, LLP

(57) ABSTRACT

Wireless and other external connectivity technology is used in various ways to enhance or improve upon existing radar detector and police activity detection systems. External memory interfaces, such as SD cards or USB, provide external storage. Wireless interfaces such as Bluetooth, Zigbee, 802.11, and wireless personal area network communication protocols, allow a detector processor to interact wirelessly with external devices, such as a Bluetooth headset, a cellular network device providing a server connection, or toggle buttons used to indicate the presence of police activity at a current position. Further, radar detectors are upgraded to provide GPS capabilities, using the existing power/data connector of the radar detector.

41 Claims, 15 Drawing Sheets

(56) References Cited

U.S. PATENT DOCUMENTS

| | | |
|---|---|---|
| 5,164,729 A | 11/1992 | Decker et al. |
| 5,177,685 A | 1/1993 | Davis et al. |
| 5,206,500 A | 4/1993 | Decker et al. |
| 5,206,651 A | 4/1993 | Valentine et al. |
| 5,250,951 A | 10/1993 | Valentine et al. |
| 5,300,932 A | 4/1994 | Valentine et al. |
| 5,305,007 A | 4/1994 | Orr et al. |
| 5,347,120 A | 9/1994 | Decker et al. |
| 5,365,055 A | 11/1994 | Decker et al. |
| 5,400,034 A | 3/1995 | Smith |
| 5,450,329 A | 9/1995 | Tanner |
| 5,485,161 A | 1/1996 | Vaughn |
| 5,504,482 A | 4/1996 | Schreder |
| 5,515,042 A | 5/1996 | Nelson |
| 5,530,447 A | 6/1996 | Henderson et al. |
| 5,539,645 A | 7/1996 | Mandhyan et al. |
| 5,559,508 A | 9/1996 | Orr et al. |
| 5,668,554 A | 9/1997 | Orr et al. |
| 5,815,092 A | 9/1998 | Gregg, III et al. |
| 5,864,481 A | 1/1999 | Gross et al. |
| 5,929,753 A | 7/1999 | Montague |
| 5,955,973 A | 9/1999 | Anderson |
| 5,977,884 A | 11/1999 | Ross |
| 5,983,161 A | 11/1999 | Lemelson et al. |
| 6,084,510 A | 7/2000 | Lemelson et al. |
| 6,118,403 A | 9/2000 | Lang |
| 6,201,493 B1 | 3/2001 | Silverman |
| 6,204,798 B1 | 3/2001 | Fleming, III |
| 6,252,544 B1 | 6/2001 | Hoffberg |
| 6,384,776 B1 | 5/2002 | Martin |
| 6,400,304 B1 | 6/2002 | Chubbs, III |
| 6,567,035 B1 | 5/2003 | Elliott |
| 6,600,409 B2 | 7/2003 | Cohen |
| 6,614,385 B2 | 9/2003 | Kuhn et al. |
| 6,670,905 B1 | 12/2003 | Orr |
| 6,718,239 B2 | 4/2004 | Rayner |
| 6,750,785 B2 | 6/2004 | Trajkovic et al. |
| 6,895,324 B2 | 5/2005 | Straub |
| 6,973,377 B2 | 12/2005 | Majstorovic et al. |
| 6,985,753 B2 | 1/2006 | Rodriguez et al. |
| RE39,038 E | 3/2006 | Fleming, III |
| 7,013,207 B2 | 3/2006 | Majstorovic et al. |
| 7,023,374 B2 | 4/2006 | Jossef et al. |
| 7,113,107 B2 | 9/2006 | Taylor |
| 7,124,006 B2 | 10/2006 | Davidson et al. |
| 7,183,942 B2 | 2/2007 | Rock et al. |
| 7,248,159 B2 | 7/2007 | Smith |
| 7,298,248 B2 | 11/2007 | Finley et al. |
| 7,301,494 B2 | 11/2007 | Waters |
| 7,362,239 B2 | 4/2008 | Franczyk et al. |
| 7,411,493 B2 | 8/2008 | Smith |
| 7,471,236 B1 | 12/2008 | Pitt et al. |
| RE40,653 E | 3/2009 | Fleming, III |
| 7,764,219 B2 | 7/2010 | Pitt et al. |
| 7,999,721 B2 | 8/2011 | Orr |
| 2002/0022920 A1 | 2/2002 | Straub |
| 2002/0135504 A1 | 9/2002 | Singer |
| 2003/0052797 A1 | 3/2003 | Rock et al. |
| 2003/0139150 A1 | 7/2003 | Rodriguez et al. |
| 2003/0218562 A1* | 11/2003 | Orr .................................. 342/20 |
| 2004/0239553 A1 | 12/2004 | Kim et al. |
| 2004/0263378 A1 | 12/2004 | Jossef et al. |
| 2006/0132349 A1 | 6/2006 | Stern et al. |
| 2007/0067086 A1* | 3/2007 | Rothschild ...................... 701/93 |
| 2007/0109187 A1 | 5/2007 | Murphy |
| 2007/0266178 A1* | 11/2007 | Wong et al. ................... 709/246 |
| 2010/0317420 A1* | 12/2010 | Hoffberg ........................... 463/1 |

OTHER PUBLICATIONS

Townsel, M., Uniden Setting Industry Standard with GPS RD, Press Release, Jan. 8.
Uniden, GPSRD, Owner's Manual.
Tracker TEL GPS, Enforna GPS Modem—GPS Tracking Products and Services, Webpage printed Aug. 5, 2009, Copyright 2005-2008.
Sixnet Newsletter, Industrial Cellular Modems—Sixnet, Webpage Printed Aug. 5, 2009, Copyright 2008-2009.
Reach unlimited Corporation, Trapster—Speed Trap Sharing System, Webpage printed Aug. 20, 2009, Copyright 2008.
Weblogs, Inc., Free iPhone App Prevents Speeding Tickets, Webpage printed Aug. 19, 2009, Copyright 2003-2009.
Motor Trend Magazine Blog, It's Not a Radar Detector. It's a Trapster, posted Nov. 12, 2008, printed Aug. 19, 2009.
International Patent Office, International Search Report for PCT/US2010/024915, Feb. 22, 2010.
Cobra Operating Manual, IntelliLinkä Wireless Remote Series XRS-R9G, Copyright 2007.
European Search Report, EP 12 16 3621, Jun. 1, 2012.

\* cited by examiner

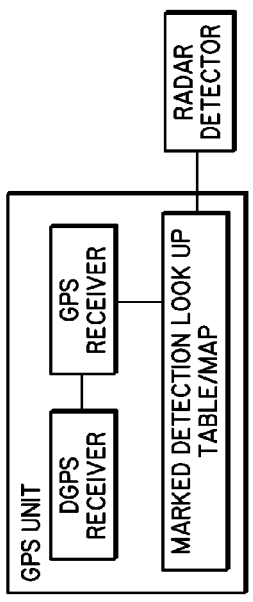
FIG. 8C1
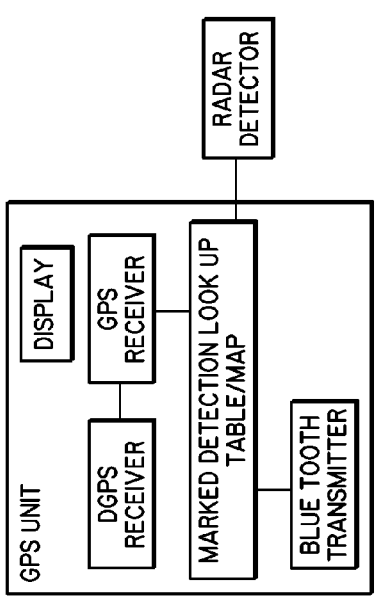
FIG. 8C2
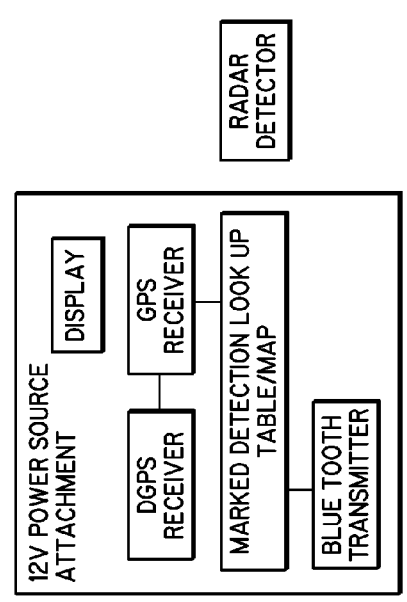
FIG. 8D
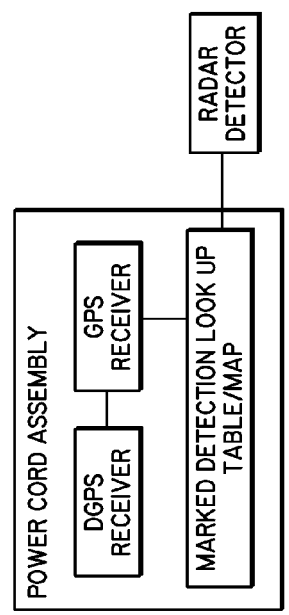
FIG. 8A
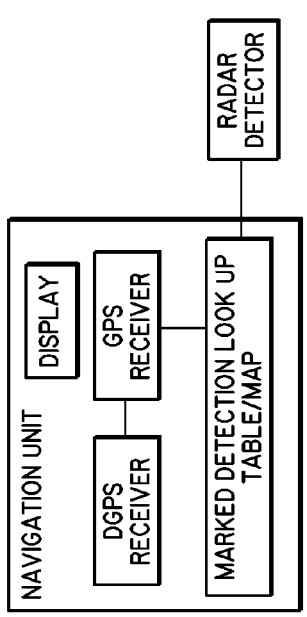
FIG. 8B1
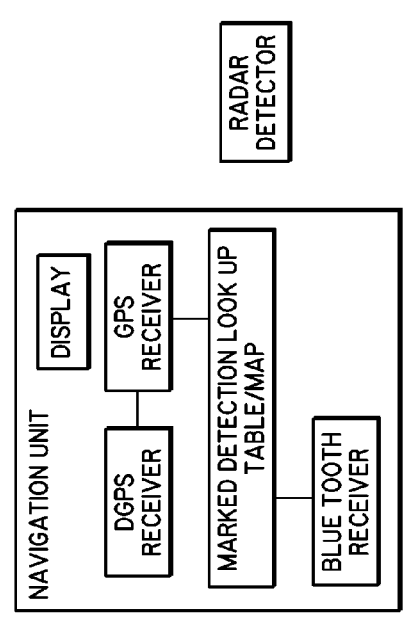
FIG. 8B2

WIRELESS CONNECTIVITY IN A RADAR DETECTOR

CROSS-REFERENCE TO RELATED APPLICATIONS

This application is a continuation-in-part application of U.S. Ser. No. 12/389,978 filed Feb. 20, 2009, and claims the benefit of Ser. No. 12/389,978 filed on Feb. 20, 2009. This application is also related to U.S. Ser. No. 11/620,443 filed Jan. 5, 2007, U.S. Ser. No. 10/396,881, filed Mar. 25, 2004, and U.S. Pat. No. 6,670,905, each of which claim benefit of U.S. Provisional Patent Application Ser. No. 60/139,097, filed Jun. 14, 1999, and U.S. Provisional Patent Application Ser. No. 60/145,394, filed Jul. 23, 1999. All of these applications are hereby incorporated herein in their entirety.

FIELD OF THE INVENTION

The present invention relates to radar detectors.

BACKGROUND OF THE INVENTION

Radar detectors warn drivers of the use of police radar, and the potential for traffic law citations if the driver exceeds the speed limit. The FCC has allocated several regions of the electromagnetic spectrum for police radar use. The bands used by police radar are generally known as the X, K and Ka bands. Each relates to a different part of the spectrum. The X and K bands are relatively narrow frequency ranges, whereas the Ka band is a relatively wide range of frequencies. By the early 1990's, police radar evolved to the point that it could operate almost anywhere in the 1600-megahertz wide Ka band. During that time radar detectors kept pace with models that included descriptive names like "Ultra Wide" and "Super Wide." More recently, police have begun to use laser (optical) systems for detecting speed. This technology was termed LIDAR for "LIght Detection And Ranging."

Radar detectors typically comprise a microwave receiver and detection circuitry that is typically realized with a microprocessor or digital signal processor (DSP). Microwave receivers are generally capable of detecting microwave components in the X, K, and very broad Ka band. In various solutions, either a microprocessor or DSP is used to make decisions about the signal content from the microwave receiver. Systems including a digital signal processor have been shown to provide superior performance over solutions based on conventional microprocessors due to the DSP's ability to find and distinguish signals that are buried in noise. Various methods of applying DSP's were disclosed in U.S. Pat. Nos. 4,954,828, 5,079,553, 5,049,885, and 5,134,406, each of which is hereby incorporated by reference herein.

Police use of laser has also been countered with laser detectors, such as described in U.S. Pat. Nos. 5,206,500, 5,347,120 and 5,365,055, each of which is incorporated herein by reference. Products are now available that combined laser detection into a single product with a microwave receiver, to provide comprehensive protection.

The DSP or microprocessor in a modern radar detector is programmable. Accordingly, it can be instructed to manage all of the user interface features such as input switches, lights, sounds, as well as generate control and timing signals for the microwave receiver and/or laser detector. Early in the evolution of the radar detector, consumers sought products that offered a better way to manage the audible volume and duration of warning signals. Good examples of these solutions are found in U.S. Pat. Nos. 4,631,542, 5,164,729, 5,250,951, and 5,300,932, each of which is hereby incorporated by reference, which provide methods for conditioning the response generated by the radar detector.

Methods for conditioning detector response are gaining importance, because there are an increasing number of signals present in the X, K, and Ka bands from products that are completely unrelated to police radar. These products share the same regions of the spectrum and are also licensed by the FCC. The growing number of such signals is rapidly undermining the credibility of radar detector performance. Radar detectors cannot tell the difference between emissions from many of these devices and true police radar systems. As a result, radar detectors are increasingly generating false alarms, effectively "crying wolf", reducing the significance of warnings from radar detectors. Among the possible sources of false alarms are microwave door openers, public safety systems such as ARTEMIS, and other radar detectors. At this time, there are very few signal sources that can cause false laser detections in comparison to the substantial list of false microwave signals just described. However certain locations near airports have been demonstrated to cause such problems for various laser detector products. The issue of false signals and ways of addressing geographically fixed false sources, is addressed in the above-referenced U.S. Pat. No. 6,670,905, in which the characteristics of false sources are stored with reference to the GPS-based location of the source, so that in subsequent encounters the false source may be ignored or the response to that source conditioned.

Vehicle electronics continue to increase in sophistication; GPS receivers and satellite receivers are now commonplace. Furthermore, wireless (typically Bluetooth) connectivity to cellular telephones and cellular networks has become commonplace, permitting hands free operation and in some circumstances, Internet or text messaging (SMS) connectivity within the vehicle electronic systems. As these vehicle electronic systems continue to propagate and increase in complexity, increasingly sophisticated functionality will be available to drivers from their vehicle electronics.

For example, a common problem with navigation devices with GPS capability is that data on the device may not updated. As such, when a user inputs into his or her navigation device the location that he or she wishes to go to, the navigation device will typically calculate the route or routes to the location using the data that is not updated stored on the device. The data may have been input into the navigation device when the navigation device was first purchased, sometimes months or years beforehand, and as such, the route or routes are calculated with data that is not updated. But to improve the calculation of routes, some navigation devices may request that a server calculate the route or routes. For instance, the server may include traffic data and therefore the route(s) the server calculates may take into account the traffic data. The server then may transmit back to the navigation device a route that does not appear to have any traffic jams. Thus, some navigation devices with GPS capability have modems built into the devices to receive the route or routes from the server.

Furthermore, some navigation devices download traffic data from servers. The device typically needs to initiate the contact with the server by requesting the traffic data, otherwise, the server does not communicate with the device. Thus, some navigation devices with GPS capability have modems built into the devices to receive updated traffic data.

Data may also be transmitted, typically one way, from a sub-carrier or stations to a navigation device to display the name of the song and artist for a song playing in the vehicle.

This data may be transmitted by FM broadcast and/or received by a modem of the navigation device.

Moreover, an application from Trapster is available for iPhone devices, BlackBerry devices, some Android devices, some Nokia devices, and other devices, which follows a driver's location as a dot on a map via GPS capability, and when the driver passes a police officer lurking by the side of the road with a radar gun, the driver may tap on his or her iPhone, for example, to mark the location as a speed trap point. That data point may then be sent to a server so that other drivers using Trapster can then be alerted of that speed trap when they approach that point on the map. The driver may report the location of live police traps (e.g. police with radar or laser guns set up), red light cameras, speed cameras, or usual police hiding spots, using the shortcut keys or menu items on the mobile phone. Thus, via the application, the iPhone may transmit to and receive data from Trapster's server.

In particular, the driver may view on his or her iPhone screen a list of the traps near the driver and the distance to each one, with the data received from the server. The application gives the driver data about when the trap was reported, the confidence level, and who reported it, and allows the driver to rate traps that were reported by other users based on whether the driver agrees or disagrees with a trap. Colors are used to indicate the "confidence" of the trap, and the confidence is incremented when different users report the same trap at the same location from their mobile device or when users rate traps via the Trapster website. Further, if a driver reports a trap, and others corroborate that report, then that driver's Karma score goes up as well.

Besides viewing the traps, the driver may be alerted (e.g., audio alerts) when he or she approaches previously reported traps, and may also get alerts for new live police reports in his or her area via text message. Indeed, some versions support viewing traps on a map, while in others, the alerts are shown as a textual description in the main application window.

Although the enhancements described have aided drivers, nonetheless, further enhancements may be made to reduce inaccuracies and improve a driver's experience.

SUMMARY OF THE INVENTION

In one aspect, the invention features a police activity detector that includes an external memory interface coupled to the detector processor, allowing the processor to connect to external memory via the interface to retrieve or store said software and/or data or copies thereof.

In specific embodiments, the external memory interface is a secure digital (SD/uSD) card interface, or a universal serial bus (USB) interface. The data in the external memory can include stored voice commands, voice files, text files in a selected language, radar source locations and characterizations, geographic locations of police enforcement activity, speed camera locations, and red light camera locations. The external interface may be in a separate housing from the detector per se, such as in a windshield mounting.

The detector may also include a safety warning system (SWS) radio receiver acquiring SWS data, and alerting a driver of SWS data acquired by the receiver.

The detector may also include a wireless networking radio for communication with networked devices using a digital networking communication standard in the IEEE 802.X family.

In a second aspect, the invention features a radar detector having a wireless device interface comprising a radio compliant with one or more of: Bluetooth, Zigbee, 802.11, and wireless personal area network communication protocols, so that the detector's processor interacting wirelessly with an external device via said wireless device interface.

In specific embodiments, the detector may pair with a Bluetooth headset, so as to deliver warnings to a user of the detector via the headset. Alternatively, the detector may pair with a Bluetooth-compatible cellular network device, allowing the detector's processor to use the cellular device to obtain an Internet connection, and exchange data with a remote server via the Internet connection, or establish a telephone connection, and exchange data with a remote server via said telephone connection by use of dual tone multiple frequency (DTMF) signaling.

In other specific embodiments, the external device may be a global positioning receiver, allowing the processor to use location data to determine whether to issue a warning to a user of the detector.

In disclosed embodiments, the external device may be enclosed in a housing that incorporates a cigarette lighter plug for obtaining 12 volt power from a cigarette lighter connector.

In a further aspect, the invention features a warning system having a global positioning system and a wireless device interface comprising a radio compliant with one or more of: Bluetooth, Zigbee, 802.11, and wireless personal area network communication protocols, allowing a processor of the warning system to interact wirelessly with an external device via said wireless device interface to obtain or store data related to positions and data relative to police activity at those positions.

In the specific disclosed embodiment, the warning system may have the form of a toggle button which may be activated by a user to indicate the presence of police activity at a current position, and which may include a speaker for generating warnings upon approach to a speed trap or other police activity area.

In other embodiments, the external device may be a Bluetooth-compatible wireless cellular device, such that the processor connects to the wireless cellular device to obtain an Internet connection, and exchanges data with a remote server via said Internet connection, or connects to the wireless cellular device to establish a telephone connection, and exchanges data with a remote server via said telephone connection by use of dual tone multiple frequency (DTMF) signaling.

In yet another aspect, the invention features a radar detector upgrade device, for use with the power/data connector on a radar detector. The device has a housing that incorporates a cigarette lighter plug for obtaining 12 volt power from a cigarette lighter connector, and a position indicating circuit for detecting a current position and storage for storing information regarding particular positions. The upgrade device couples power obtained from the cigarette lighter connector to the radar detector, and receives indications of alerts from the connected radar detector. The upgrade device also references the current position and stored data to determine whether to mute the alert in the event the current location correlates to a location at which an alert is to be muted.

The upgrade device may also learn locations of police activity or false alarms thereof by storing a current location as identified by said position indicating circuit when an alert is indicated by the radar detector.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 8A is an illustration of a radar detector coupled to an aftermarket power cord assembly incorporating GPS functionality.

FIGS. 8B1 and 8B2 illustrate alternate embodiments in which a navigation unit communicates via wired or wireless connections to a radar detector.

FIGS. 8C1 and 8C2 illustrate alternate embodiments in which a GPS unit communicates via wired or wireless connections to a radar detector.

FIG. 8D illustrates an embodiment in which a 12 volt power source attachment including a display communicates wirelessly with a remote radar detector.

DETAILED DESCRIPTION OF SPECIFIC EMBODIMENTS

Figure 1:
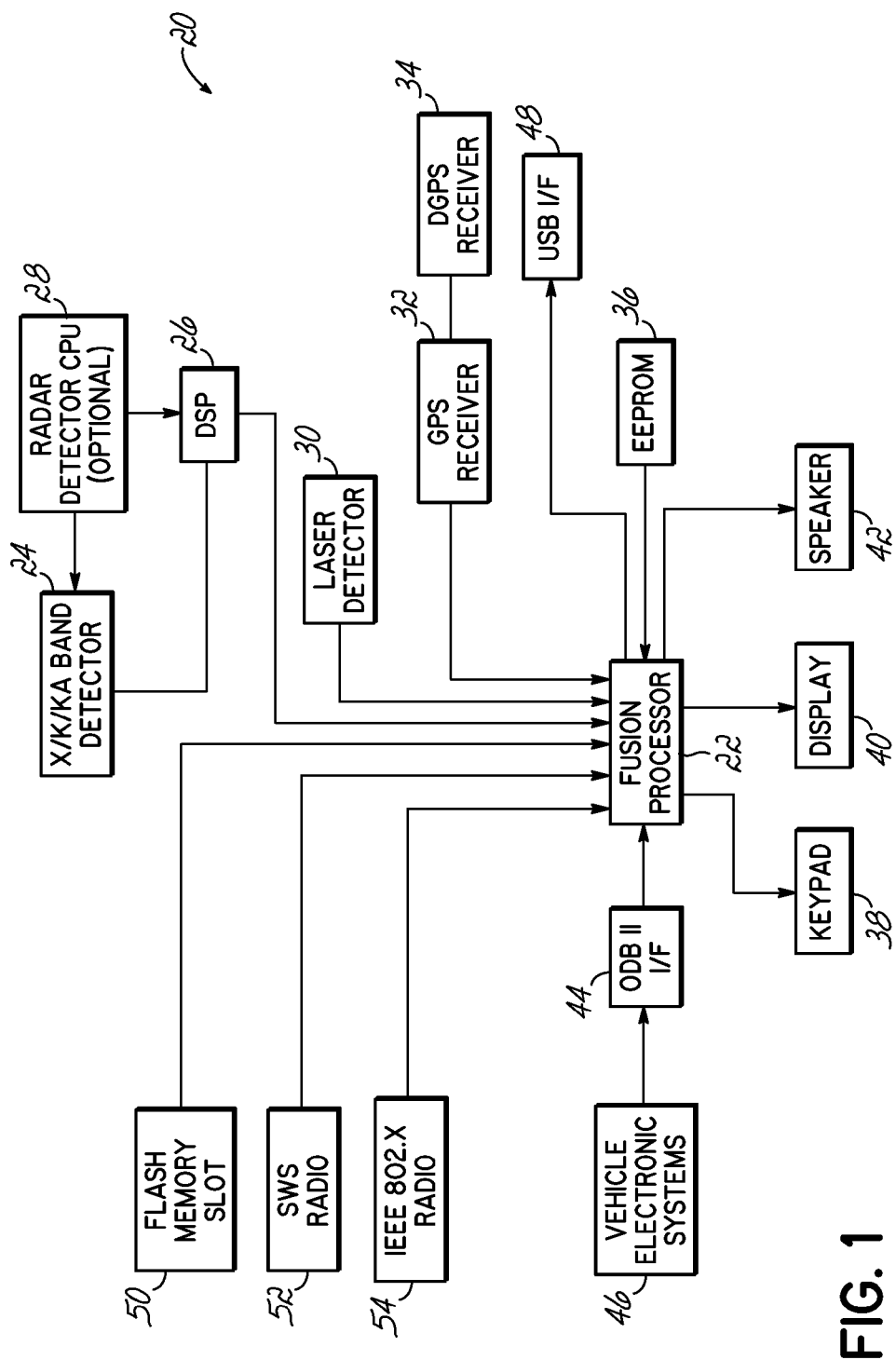
FIG. 1 is an electrical block diagram of a radar detection circuit in accordance with principles of the present invention.

Referring now to FIG. 1, the radar detector 20 in accordance with principles of the present invention includes a processor 22 for controlling all functions of the unit. Processor 22 receives information on radar signals from a conventional X/K/KA band microwave receiver 24, coupled to processor 22 via a digital signal processor (DSP) 26. Microwave receiver 24 and DSP 26 may utilize any of the techniques described above and in the above-referenced patents, for rejecting noise and increasing discrimination between actual and spurious police radar signals. Further, receiver 24 and DSP 26 may be controlled by an optional second CPU 25, which can enable additional signal evaluation beyond that which is possible using a DSP.

Processor 22 is further connected to a laser detector 30 for detecting police LIDAR signals. Processor 22 is further connected to a GPS receiver 32 and a separate differential GPS (DGPS) receiver 34, such that differential GPS methodologies may be used where beacon signals are available. Since the radar detector application described in this patent is not a candidate for military class service, it is not able to access the more accurate PPS. However it is considered a "civil user" and can use the SPS without restriction.

Processor 22 executes a stored program, found in an electrically erasable programmable read only memory (EEPROM) 36, flash memory, or masked read only memory (ROM). The processor is programmed to manage and report detected signals in various ways depending on its stored program. This programming includes functions for detector response conditioning, as elaborated below.

The radar detector further incorporates a user input keypad or switches 38. Operational commands are conveyed by the user to processor 22 via the keypad. Processor 22 is further connected to a display 40, which may comprise one or more light emitting diodes for indicating various status conditions, or in a more feature-rich device, may include an alphanumeric or graphical display for providing detailed information to a user. A speaker 42 is also provided to enable processor 22 to deliver audible feedback to a user under various alert conditions, as is elaborated below.

Processor 22 may further include an interface 44, such as an ODB II compliant interface, for connection to vehicle electronic systems 46 that are built into the vehicle. Modern vehicles are being equipped with standardized information systems using the so-called OBD II standard interface. This standard interface is described in an article entitled ODB II Diagnostics, by Larry Carley, from Import Car, January 1997, which is hereby incorporated herein by reference. Processor 22, using the OBD II standard interface 44, can obtain vehicle speed and other vehicle status information directly from the vehicle, and then may use this information appropriately as described in more detail below. Additional and more detailed information and functionality may be obtained by Intelligent Vehicle Data Bus (IVDB) systems that may in the future be incorporated into vehicles in addition to or in place of OBD II.

Processor 22 is further coupled to a Universal Serial Bus (USB) interface 48 (which may be of the series "mini-B" variety) that provides a means for uploading and downloading information to and from processor 22. It should be noted that there are three types of USB connection, Series "A","B", and "mini-B". The series "mini-B" receptacle has the dimensions 6.9 mm by 3.1 mm, whereas series "A" has the dimensions 12.5 mm by 5.12 mm. The standard USB is of the series "A" variety. In one embodiment the present invention contemplates the use of the series "mini-B" receptacle. The "mini-B" would utilize less space on the detector than the standard series "A" USB. USB interface 48 may be used to automate the assimilation of coordinate information into data structures in EEPROM 34, as described below.

Processor 22 may serve as a host on USB interface 48, or may serve as a slave on that same interface. In the former case, USB interface 48 may also be used to interface the detector to a USB storage device such as a flash memory. In the latter case, the USB interface 48 may permit the processor to communicate with a separate host computer or product application for the purposes of updating or monitoring the activity of the detector.

External storage devices coupled via USB interface 48 may have a larger storage capacity than available from internal memory. Remote storage devices may include any form of dynamically allocatable storage device (DASD) such as a flash memory, hard disk drive, removable or fixed magnetic, optical or magneto-optical disk drive, or removable or fixed memory card, or any device including a dynamic directory structure or table of contents included in the storage format to permit dynamic storage allocation. The storage device, or host computer or other connected device need not be visible to the driver and may be in any convenient location, such as under the vehicle dash.

USB interface 48 may also be used for the purposes of firmware upgrade. From time to time updates and bug fixes may become available, e.g. through a manufacturer website. USB interface 48 will enable the user to apply the appropriate firmware upgrade or bug fix, whereas in a prior embodiment the manufacturer would have conducted such an upgrade.

USB interface 48 could also be used to add other user waypoints. The Internet provides a convenient means for storing and accessing repositories of information. Web sites may be established and devoted to this task, and provide several convenient types of training information. One could be a training file containing the coordinate information from the online "Speed Trap Registry" at the Internet site www.speedtrap.com. This information would be usable to set "always warn" bits at the locales of known speed traps. A second type of training information would be training files submitted by individuals for use in particular areas, and the third type of information would be aggregate training files created by integrating individually-submitted information into single files organized by region. Aggregate training files would be managed and updated by the web site administrator.

Where a host computer is used in conjunction with the radar detector 20, coordinate information can be stored, e.g., on a hard drive organized with an indexed database structure to facilitate rapid retrieval, and the hard drive may include a special purpose processor to facilitate rapid retrieval of this information. Where a general purpose host computer is connected via the USB interface, it will likely be based on a higher scale CPU chip and thus be able to efficiently carry out complex coordinate comparison tasks such as are described below, and such tasks may be delegated to the host CPU rather than carried out in processor 22. The host CPU can also anticipate the need for information about particular coordinates based upon vehicle movements, and respond by retrieving records within proximity of the current location for ready delivery to fusion processor 22. The host computer can also provide navigational functions to the driver, potentially using stored signal information and flag bits to provide the user with location-specific information about driving hazards and potential police stakeout locations.

As an alternative to a USB interface, radar detector 20 may include wired or wireless functionality for exchange of data. For example, in a wired embodiment, a flash memory slot 50 such as a secure digital (SD) or micro secure digital (uSD) slot could be used to provide data to and obtain data from the radar detector 20. Flash memory may provide a larger memory space available for databases, as an augmentation to the EEPROM memory 36.

Flash memory is non-volatile computer memory that can be electrically erased and reprogrammed. The non-volatile designation means that no power is needed to maintain the information stored on the card. In addition, flash memory offers fast read access times and better kinetic shock resistance than a hard disk. Another feature of flash memory is that when packaged in a memory card (or a USB device), it is enormously durable, being able to withstand intense pressure, extremes of temperature, and even immersion in water. These features make a flash memory card an ideal candidate for the harsh environment inside a vehicle. Some flash memory card formats include Secure Digital (SD), micro Secure Digital (uSD), Secure Digital High Capacity (SDHC), and Secure Digital Input Output (SIDO).

It will be appreciated, as noted above, that flash memory functions described above may be achieved by a USB connectable flash memory device. In this implementation the radar detector 20 USB connector 48 hosts a mass storage device rather than or in addition to being usable as a USB slave device.

Processor 22 is further coupled to a Safety Warning System (SWS) radio 52 capable of signals from Dedicated Short Range Communication (DSRC) beacons transmitting on the 5.9 GHz frequency band and designated for vehicle use. The SWS/DSRC is an infrastructure capable of transmitting warning information to surrounding vehicles in the vicinity of travel of various, possibly hazardous, situations. Some transmitted warnings include freezing bridge warnings, fog zone warnings, rest area alerts, rail road crossing warnings, and construction zone alerts. In accordance with principles of the present invention, SWS information may be received and alerted to a driver through numerous possible user interfaces as disclosed herein.

Processor 22 further incorporates an IEEE 802.X radio 54 that provides a means for sending data packets across local area networks or metropolitan area networks. Specifically, the IEEE 802.X interface 54 may be used to transmit data packets via the 802.11 family, also known as wireless local area network computer communication (Wi-Fi), developed by the IEEE LAN/MAN Standards Committee in the 5 Ghz and 2.4 Ghz public spectrum bands. The IEEE 802.X interface 54 may also be used to transmit data packets via the 802.15 family, also known as wireless personal area network (WPAN) communication. This specific family can be further divided into two subgroups designated 802.15.1, known as Bluetooth, and 802.15.4, known as Zigbee.

Bluetooth is a wireless protocol utilizing short-range communications technology facilitating both voice and data transmissions over short distances from fixed and/or mobile devices, creating the aforementioned WPANs. The intent behind the development of Bluetooth was the creation of a single digital wireless protocol, capable of connecting multiple devices and overcoming issues arising from synchronization of these devices. Bluetooth provides a way to connect and exchange information between devices such as GPS receivers, radar detectors, personal headsets, and mobile phones over a secure, globally unlicensed 2.4 GHz short-range radio frequency bandwidth.

Zigbee is a wireless protocol utilizing low-rate WPANs, and focuses on low-cost, low-speed ubiquitous communication between devices. The emphasis is on very low cost communication of nearby devices with little to no underlying infrastructure, intending to lower power consumption. The touted feature of Zigbee is the ability to achieve extremely low operational costs, due to reduced power consumption, and its technological simplicity.

Although Bluetooth and Zigbee are not expressly intended for this use, in accordance with principles of the present invention, the radar detector 802.x radio could pair with a cellular telephone using a headset or other handsfree device profile, to enable the radar detector to dial telephone numbers and exchange DTMF signals, or alternatively to use text messaging/SMS to communicate information to and from a remote server and/or database.

Bluetooth or other 802.x technology may also be used to connect a conventional headset profile to the radar detector 802.x radio, so as to provide remote audio alerting to the conventional headset. This implementation may find particular utility in motorcycles or convertibles where a speaker integrated into the radar detector may be difficult to hear.

As an example, signal information may also be downloaded from various hosts, for example, a connection may be established directly via the USB interface or a wireless interface to an Internet site carrying signal information, as is now done in a text form at the Internet site www.speedtrap.com. An indirect Internet connection may also be established via a cellular telephone, WiFi hot spot, or host computer. Connections may be used to obtain speed trap information, as discussed above, or to obtain other speed monitoring information such as speed camera locations. Furthermore, a connection may be used to check for available firmware updates or other system changes that need to be announced to all enabled devices. Furthermore, peer-to-peer connections may be established between two receivers, e.g. a trained receiver having extensive signal information, and a receiver having less extensive information, to transfer signal information between the receivers so that either or both has a more complete set of signal information. Speed camera locations and firmware may also be transferred in this peer-to-peer mode. Finally, it will be appreciated that peer-to-peer connections may be made directly over an 802.x ad-hoc network, or may be made through a LAN or Internet infrastructure utilizing a peer locating server as is now commonly used in file sharing and gaming networks.

In one embodiment, a database of locations is incorporated within the radar detector 20, and processor 22 is a multi-threading processor, such that the multithreading processor 22 manages the location database without involvement of external processors or hosts. The multithreading processor 22 may be programmed to allow rapid continuous processing of records in the location database using parallel threads. Generally speaking, processor 22 compares the radar detector's immediate coordinates with a stored list of the coordinates of unwanted stationary sources. If the radar detector receives a microwave/laser signal within a certain distance of one of these pre-designated sources, processor 22 applies additional constraints to the detection criterion before alerting the user. Since stationary radar sources make up the bulk of the unwanted sources, there is a significant benefit resulting from these functions.

It will be appreciated that processor 22 may execute a program on EEPROM 36 or may execute a stored program found in flash memory in slot 50, in addition to or instead of the programming found in EEPROM 36. Furthermore, firmware upgrades from flash memory may include, for example, voice files used by the radar detector to provide voiced alerts as is now a common feature. This functionality provides a ready upgrade path to language extension of the device to different markets, and allows updating and upgrading of functions to include voiced feedback as well as on-screen displays. Furthermore, it will be appreciated that the flash memory slot may be incorporated into a device in wireless communication with the processor 22 via, for example, the 802.x radio 54, so that flash memory in a connected cellular telephone, power source attachment, vehicle navigation system, or dashboard GPS receiver or radar detector display, may conveniently include a flash memory card reader slot that is accessible to processor 22.

Figure 3:
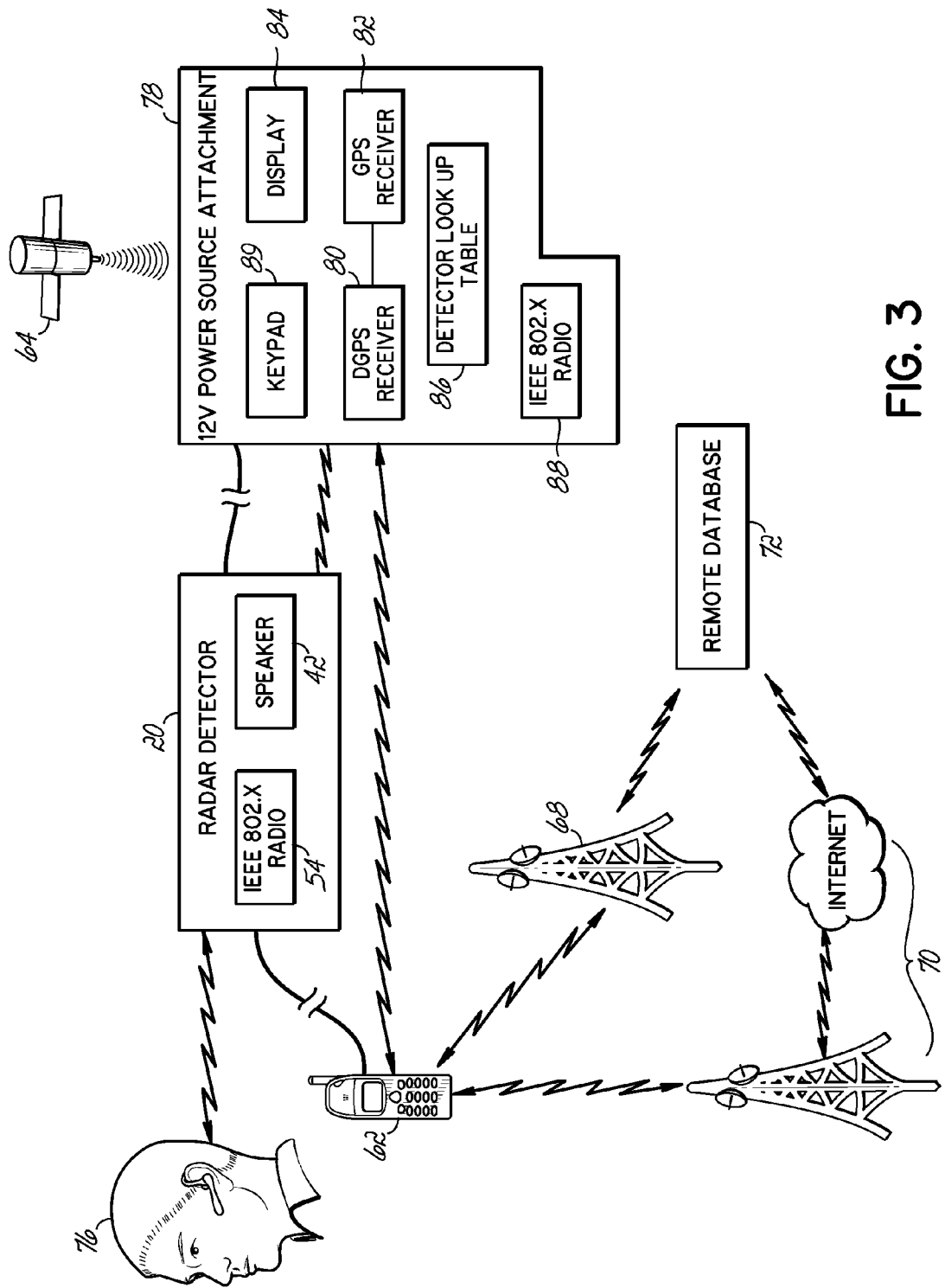
FIG. 3 is a block diagram of an embodiment of the present invention in which radar detector functionality is incorporated into a 12 volt power source attachment.

FIG. 3 illustrates a block diagram of the present invention in operation in a particular vehicle environment. The embodiment includes a radar detector 20, power supply 60, mobile telephone 62, location sensing satellite 64, SWS communication network 66, telephone communication network 68, Internet communication network 70, and a remote database 72. In this embodiment the detector 20 obtains operational power through a power supply 60 connected by an operable means, such as the SmartPlug which is used by the assignee of the present invention. However, operational power may be provided through on board means, such as a rechargeable battery. Operational power is described as the power required to allow the detector to execute all described functions.

In the embodiment of FIG. 3, the detector 20 has an operable connection with a mobile telephone 62. In this embodiment the mobile telephone 62 is enabled with IEEE 802.15.1 technology, also known as Bluetooth. While the operable connection between the detector 20 and the mobile telephone 62 may be in the form of a serial or USB cord, many cellular telephones presently available permit communication through the IEEE 802.X radio 54 of the detector 20. The detector 20 also incorporates a Safety Warning System radio 52 that allows the detector 20 to receive informative messages regarding upcoming or ongoing road conditions.

During a radar detection alert in this embodiment, the detector 20 is able to obtain the GPS coordinates of the detection, accomplished by communications between satellites 64, beacons (not shown), the DGPS receiver 34 and GPS receiver 32 of the detector 20. With the coordinates obtained by the receivers 32, 34, the detector 20 is able to determine whether the detected signal can be correlated with a signal detected in a previous radar detection encounter. To correlate the present signal detection with a previous detection encounter, the detector 20 compares various parameters of the current detection with the stored parameters of the previous detection. Parameters that may be evaluated are the signal signature of the present detected signal versus the signal signature of a previously detected signal within a predetermined area of the received coordinates, the detector's rate of travel at the time of the present detection versus the rate of travel at the time of a previous detection within a predetermined area of the received coordinates, the direction of travel at the time of the present detection versus the direction of travel at the time of a previous detection within a predetermined area of the received coordinates. These parameters are stored on a detection look up table 74 located on the EEPROM 36 of the detector 20.

Once a detection has been matched with a previous detection the detector 20, evaluates past user input during the previous detection when deciding whether and how to alert driver of the present detection. If the user has designated the matched detection as a false alert, then the detector 20 may mute the speaker 42 and/or forego a visual alert. Alternatively, if the user has designated the matched detection as an authentic detection, then the detector 20 may alert through the speaker 42 and/or create a visual alert. Additionally, the detector may send an audible alert to a Bluetooth headset 76 through the IEEE 802.X radio 54. This feature is especially useful in environments where the user may have difficulty hearing an alert tone from the detector's speaker 42 or would prefer a more personal in ear alert.

The operable connection with the mobile telephone 62 allows the detector 20 to communicate with a remote database 72. The remote database 72 stores transmitted GPS coordinates of an observed radar encounter or a detected radar encounter. An observed radar encounter is a situation when the user notices a speed trap, traffic camera, or other mechanism designed for purposes of ticket revenue or traffic deterrence instead of safety that may or may not be emitting radar. A speed trap may be defined as a location where the police strictly enforce the speed limit. Alternatively, a speed trap may be defined as a road section where police are known to have a reputation for writing an unusually high number of traffic tickets, the posted speed limits are not easily seen, or the speed limits are set much lower than a road engineering survey may suggest.

The communication with the remote database 72 of the present invention involves the user operatively indicating to the detector 20 that the present detection (observed or detected) is a speed trap. This may be done with a switch, remote button, or by a button located on the detector 20. Once a user operatively characterizes a detection as a speed trap, the detector 20 communicates with the mobile telephone 62, which communicates particular parameters to the remote database 72. The communication between the mobile telephone 62 and the remote database 72 may be accomplished through a telephone communication network 68 such as a GSM or CDMA2000 protocol. Communication through a telephone communication network 68 may be in the form of a short message through the short message service (SMS). The communication through the telephone communication network 68 may also be in the form of dual tone multi-frequency (DTMF), also known as touchtone. Where the mobile telephone 62 is capable of Internet connectivity, the communication between the mobile telephone 62 and the remote database 72 may be accomplished through an Internet communication 70. The mobile telephone 62 may obtain Internet connectivity to the remote database 72 through Internet communication 70 protocols such as WiFi, Zigbee, EDGE, or 3G.

The detector 20 may also receive notifications from the remote database 72. These notifications may communicate the location of speed traps that other detector users have observed and reported. By broadcasting the GPS coordinates through Internet communication means 70 or telephone communication means 68 in operable communication with the mobile telephone 62 that is in operable communication with the detector 20, the remote database 72 is able to send information to the detector 20. This information include the GPS coordinates of speed traps indicated by other detector users. This feature can provide real time speed trap notification to detector users and alert them to proceed with caution when a speed trap is approached.

The present invention also contemplates the use of non-GPS enabled detectors. FIG. 3 illustrates a block diagram of an embodiment of the present invention where the detector is an non-GPS enabled detector 20. In this embodiment the power source attachment 78 houses a DGPS receiver 80, a GPS receiver 82, a status display 84, and a detection look up table 86. In this embodiment the detector 20 may obtain operational power through the power source attachment 78, and operatively communicate with the power source attachment 78 regarding previous and present detections through a USB or serial cord connection or through IEEE 802.X radio 88.

Optionally, radar detector 20 may itself include an 802.x radio permitting wireless communication with power source attachment 78, in which case radar detector 20 may be battery powered, or may be remotely located such as in the vehicle's grille area, requiring only a 12 volt power connection for complete installation.

Figure 2:
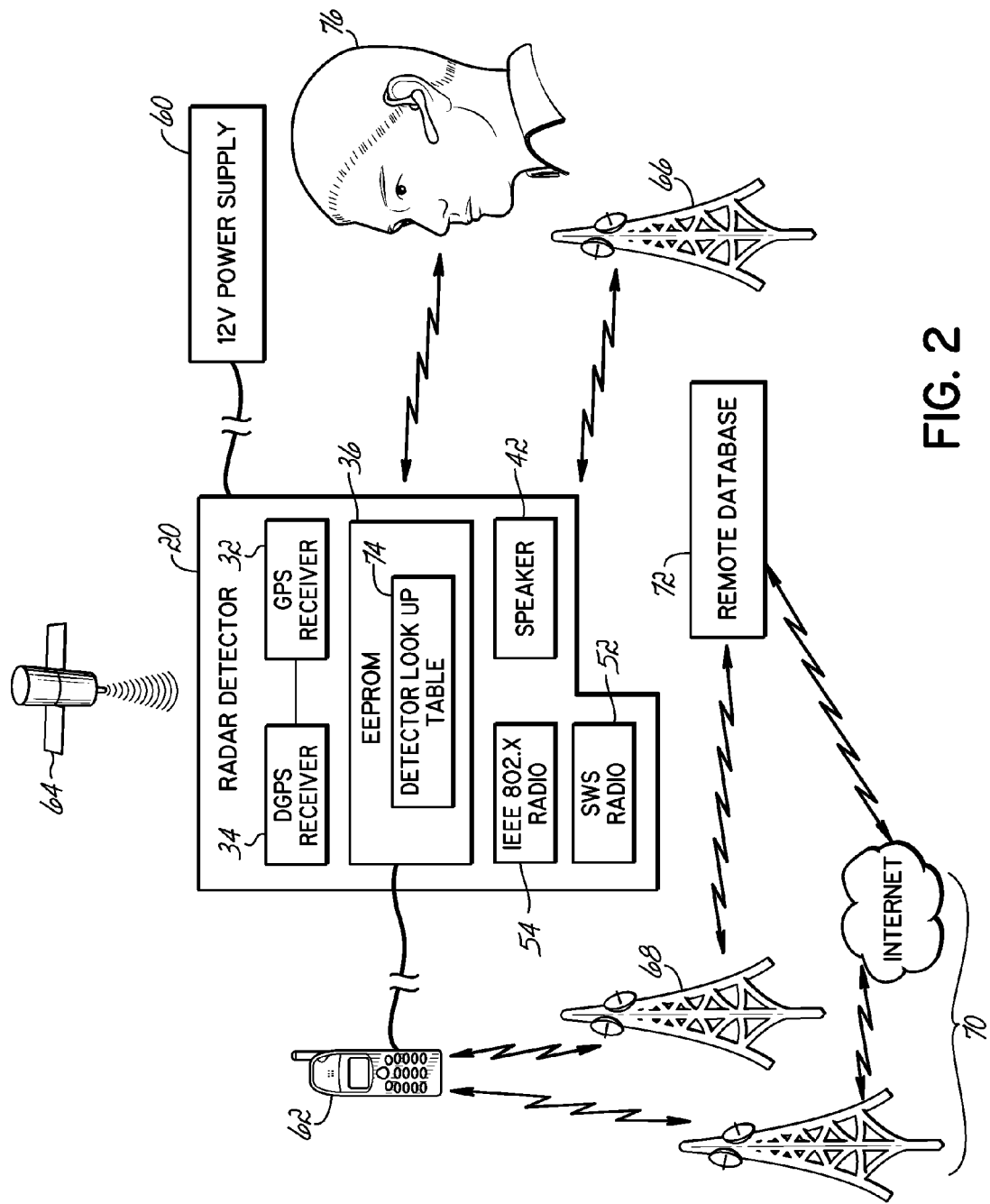
FIG. 2 is a functional block diagram of the radar detector of FIG. 1 placed within its operating environment to demonstrate possible uses.

As is done by circuits within the detector of FIG. 2, the power source attachment 78 correlates stored data parameters of a present detection to the parameters of a previous detection and mutes the speaker 42 of the detector 20 and/or the visual alert accordingly. The power source attachment 78 is also equipped with a means of designating speed trap locations. This may take the form of a button or switch located on a keypad 89 of the power source attachment 78. In this embodiment, the power source attachment 78 is in operable communication with the mobile telephone 62, and with this configuration the user is still able to designate speed traps and communicate with the remote database 72 with similar communication means described above. The power source attachment 78 may also receive updated information regarding speed trap locations from the remote database 72 with similar communication means described above. Also as noted above, the power source attachment 78, or the detector 20 itself, can transmit warnings to a Bluetooth headset 76 through the IEEE 802.X radio 54.

Figure 4:
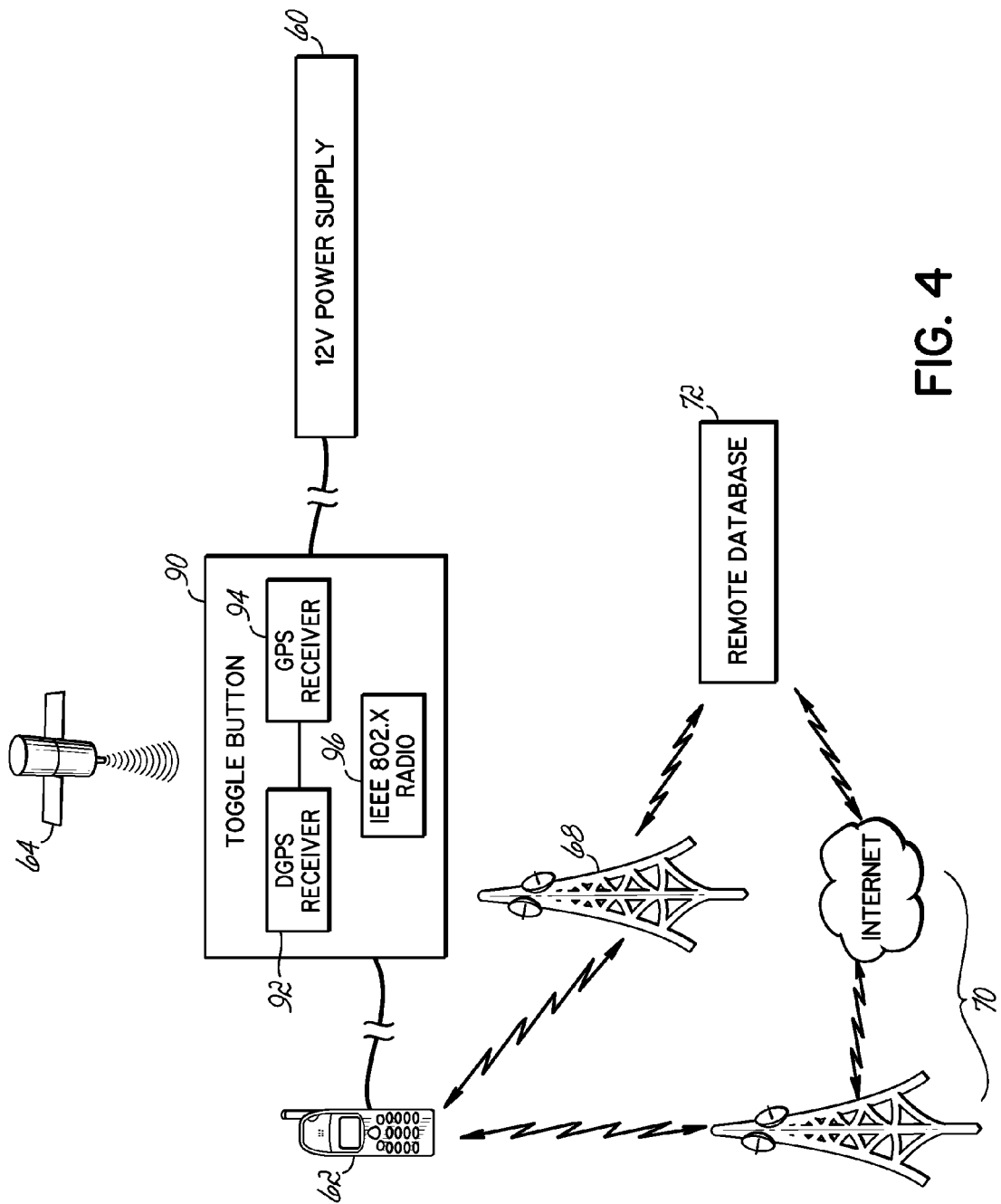
FIG. 4 is a block diagram of an embodiment of the present invention where a toggle button is in operable communication with a mobile communication device for speed trap detection.

FIG. 4 illustrates a block diagram of an embodiment of the present invention where there is no radar detector present. In this embodiment a button assembly 90 houses a DGPS receiver 92, GPS receiver 94, and an IEEE 802.X radio 96. The button assembly 90 is in operative communication with a power supply 60, and a mobile telephone 62. The communication between the button assembly 90 and the mobile telephone 62 may be made either by a serial or USB connection or through the IEEE 802.X radio 62.

In the embodiment of FIG. 4, the toggle button assembly 90 includes a GPS receiver 94 and DGPS receiver 92 for detecting a current location, and interacts via an IEEE 802.x radio with a cellular telephone 62 or other communication device to retrieve speed trap locations from a remote database 72. This communication may be by the telephone communication network 68, or the Internet communication network 70 by the means described above. Nearby speed traps which have been identified in the database are acquired and if the vehicle approaches one of those speed traps, a warning is delivered via the cellular telephone 62 or via a display and/or speaker which may be included in the toggle button assembly 90.

Furthermore, when a user of the embodiment of FIG. 4 visually detects a speed trap, the user may activate the button assembly 90, by toggling a button, switch, or knob. Once activated the button assembly will document the GPS coordinates received by the DGPS and GPS receivers 92, 94 that communicate with the location sensing satellite 64, and then operatively communicate the information to the mobile telephone 62. The mobile telephone 62 may then transmit the coordinates of the detection to the remote database 72. Subsequently, other travelers may receive Internet messaging, or retrieve an update from database 72, including the annotation of the speed trap, and deliver the appropriate warnings.

Figure 5:
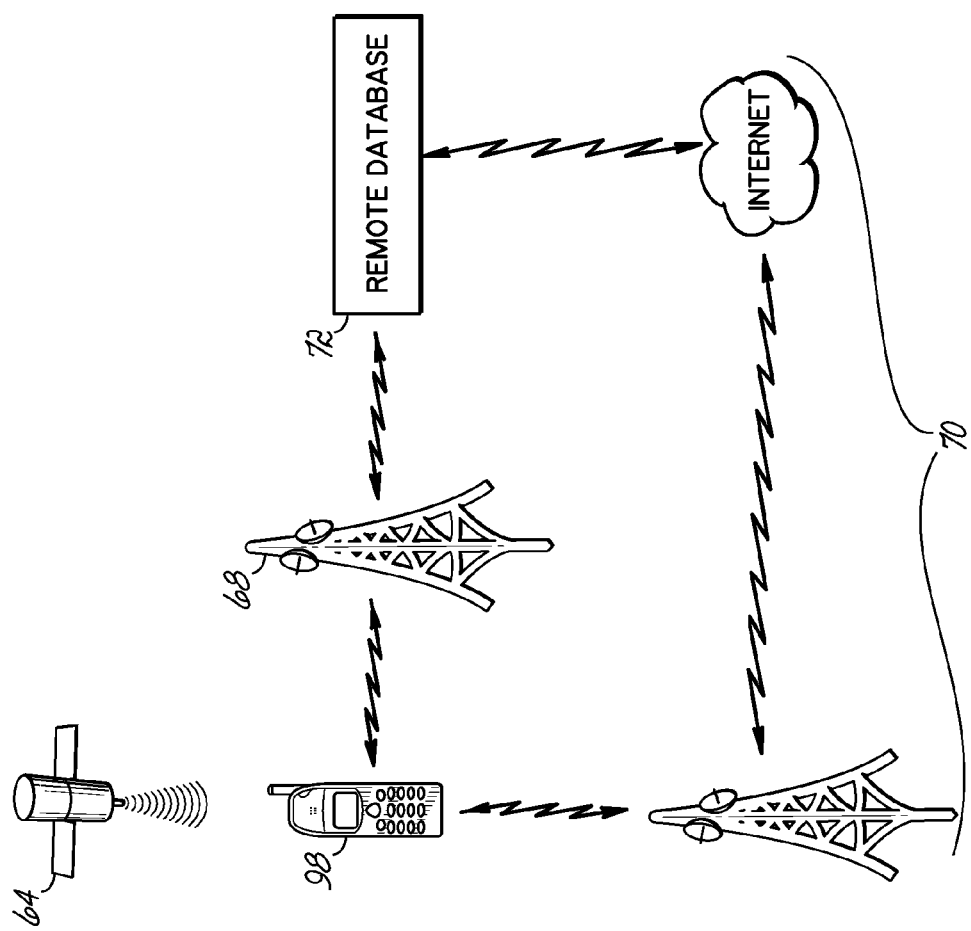
FIG. 5 is a block diagram of a speed trap detection system that uses only mobile communication devices.

FIG. 5 illustrates, for comparison, a block diagram of an embodiment of a speed trap detection system that utilizes a mobile phone. Recently a system of this kind has been marked at the URL www.trapster.com. In this application, a user reports the detection of a speed trap through an application on a GPS enabled mobile telephone 98 by pressing a programmed button on the phone 98. Button activation will cause the phone 98 to document the GPS coordinates received from a locating satellite 64, and send the received coordinates of the indicated speed trap to the remote database 72 by a telephone communication network 68, or via an Internet communication network 70. Subsequently, the application on the GPS enabled mobile telephone may retrieve locations of speed traps stored in remote database 72 and deliver responsive alerts to the user of the phone. This embodiment requires the use of a GPS enabled mobile telephone, a customized application on that telephone, and the constant operation of that application on the telephone, none of which are required in the embodiment of FIG. 4, making FIG. 4 more usable for many environments which are not available in FIG. 5.

Figure 6:
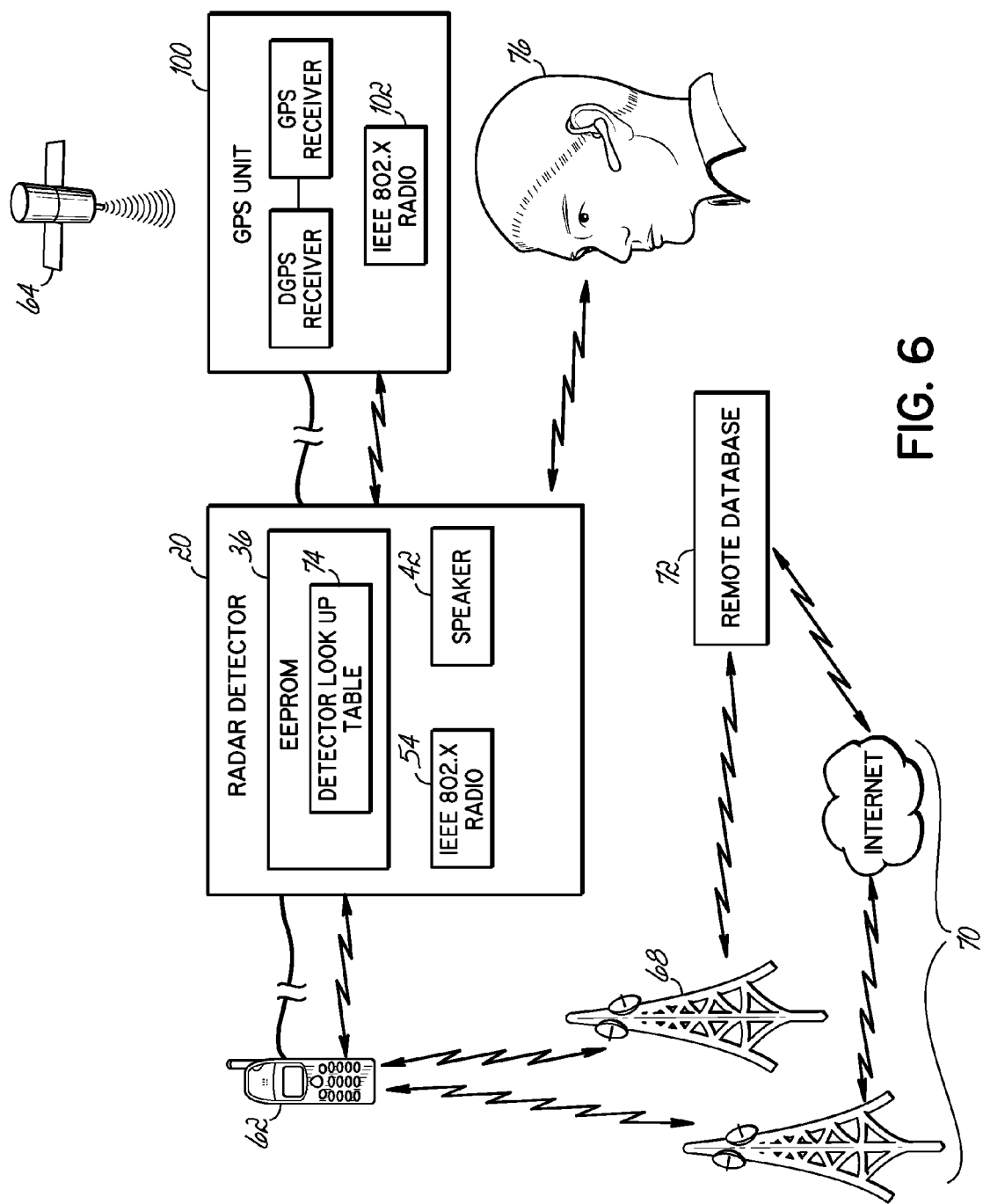
FIG. 6 is a block diagram of an embodiment of the present invention where a radar detector is in operable communication with a GPS unit.

FIG. 6 illustrates a block diagram of an embodiment of the present invention where the detector 20 is in operable communication with a GPS unit 100. In this embodiment the detector 20 and GPS unit 100 may communicate through a serial or USB connection, or through IEEE 802.X radios 54, 102. When the detector 20 detects radar, it will access the coordinates provided by the GPS unit 100 that is in operable communication with a location sensing satellite 64, and determine whether the detected signal can be correlated with a signal detected in a previous radar detection encounter. Accessing the detector look up table 74 located on the EEPROM 36 and correlating of the present signal with a previous detection encounter as described above. Additionally, whether and how the detector 20 alerts through the speaker 42 is described above. The detector 20 in this embodiment is in operative communication with a mobile telephone 62 either by a serial or USB connection or through the IEEE 802.X radio 54. Through this connection the invention is able to operatively communicate with the remote database 72 by a telephone communication network 68 or an Internet communication network 70 through the method described above. The detector 20 in this embodiment is also able to receive speed trap location updates from the remote database 72. The detector 20 may send an audible alert to a Bluetooth headset 76 through the IEEE 802.X radio 54.

Figure 7:
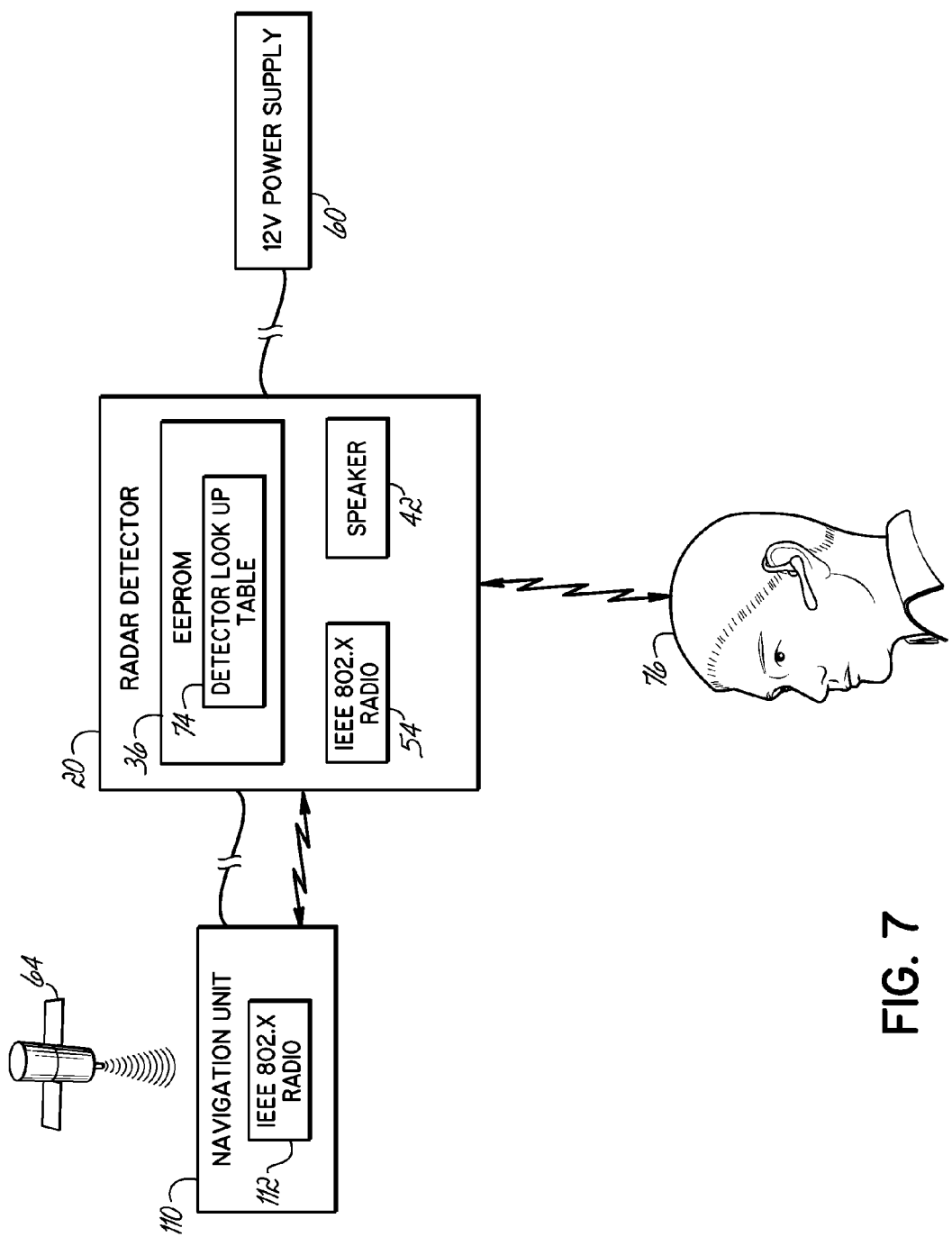
FIG. 7 is a block diagram of an embodiment of the present invention where a detector is in operable communication with a navigation unit.

FIG. 7 illustrates a block diagram of an embodiment of the present invention where the detector 20 is in operable communication with a power supply 60 and a navigation unit 110. In this embodiment the detector 20 is in operative communication with a navigational unit 110 through a serial or USB connection, or through IEEE 802.X radios 54, 112. When the detector 20 detects radar, it will access the coordinates provided by the navigational unit 110 that is in operable communication with satellites 64 and determine whether the detected signal can be correlated with a signal detected in a previous radar detection encounter. The detector 20 then accesses the detector look up table 74 located on the EEPROM 36 and correlating of the present signal with any previous detection encounter as described above, and determines whether and how to alert through the speaker 42 as described above. The detector 20 may send an audible alert to a Bluetooth headset 76 through the IEEE 802.X radio 54.

Referring now to FIG. 8A, in an alternative embodiment the invention may be implemented as a substitute power cord assembly for a radar detector. In this embodiment the power cord assembly includes a GPS receiver, DGPS receiver and marked detection lookup table or map. The power cord assembly is coupled to a conventional radar detector to provide power to the detector and to provide a mute signal to the detector. It will be appreciated that the power cord used with many conventional radar detectors includes a signal line for a mute signal, which is activated by a pushbutton on the power cord assembly. The power cord assembly of FIG. 8A connects to this mute signal line and provides a mute signal to the detector in the event that the location of the detector, as determined by the GPS receiver in the power cord assembly, correlates to a rejectible signal as identified in the lookup table in the power cord assembly. The database in the power cord assembly may be updated in the event that the user mutes an alert of a radar signal being generated by the radar detector, e.g., the power cord assembly may provide the user the option to store the location where the mute was engaged, to prevent future alerts at the same or a similar location.

The embodiment of FIG. 8A may be further implemented through a firmware upgrade to a conventional radar detector. New firmware in the detector may cause the detector to differently condition its alerts upon responses from the power connector, so that the GPS receiver in the power cord is more tightly coupled to the radar detector and more tightly controls the alerts from the GPS receiver in a manner more directly akin to an integrated unit.

FIGS. 8B1 and 8B2 illustrate an embodiment of the invention in which an integrated vehicle navigation unit that includes GPS receivers, a display and a map function, communicates with a radar detector. The connection to the radar detector may be wired as shown in FIG. 8B1 or wireless via a Bluetooth or other 802.x radio as shown in 8B2. In either case, an application in the navigation unit operates to generate alerts of radar when detected by the attached radar detector, and further communicates with a stored lookup table or map to suppress radar warnings in the event that a detected signal correlates to a rejectable signal, and to store false signal locations when identified by the user via the user interface of the navigation unit.

FIGS. 8C1 and 8C2 illustrates an embodiment similar to FIGS. 8B1 and 8B2 in which a dashboard GPS receiver, which includes GPS receivers, a display and a map function, communicates with a radar detector. Here again, the connection to the radar detector may be wired as shown in FIG. 8C1 or wireless via a Bluetooth or other 802.x radio as shown in 8C2. In either case, an application in the GPS unit generate alerts of radar when detected by the attached radar detector, and further communicates with a stored lookup table or map to suppress radar warnings in the event that a detected signal correlates to a rejectable signal, and to store false signal locations when identified by the user via the user interface of the GPS unit.

FIG. 8D illustrates an alternative embodiment of the invention in which a 12 volt power source attachment including GPS and DGPS receivers and a display, is coupled via a Bluetooth or other 802.x radio to a remote radar detector that includes Bluetooth functionality but does not include GPS functionality. One example of such a device is the radar detection unit sold by K40 Electronics under the brand name Calibre. In this embodiment, the power cord assembly communicates via Bluetooth or another 802.x wireless communication standard with the remote radar detector to acquire information about radar warnings, and the power cord assembly generates warnings on the display of the power source attachment. Further, the power source attachment communicates with a stored lookup table or map to suppress radar warnings in the event that a detected signal correlates to a rejectable signal, and may include a user interface such as a mute button, usable to store false signal locations when identified by the user via that user interface.

Figure 9:
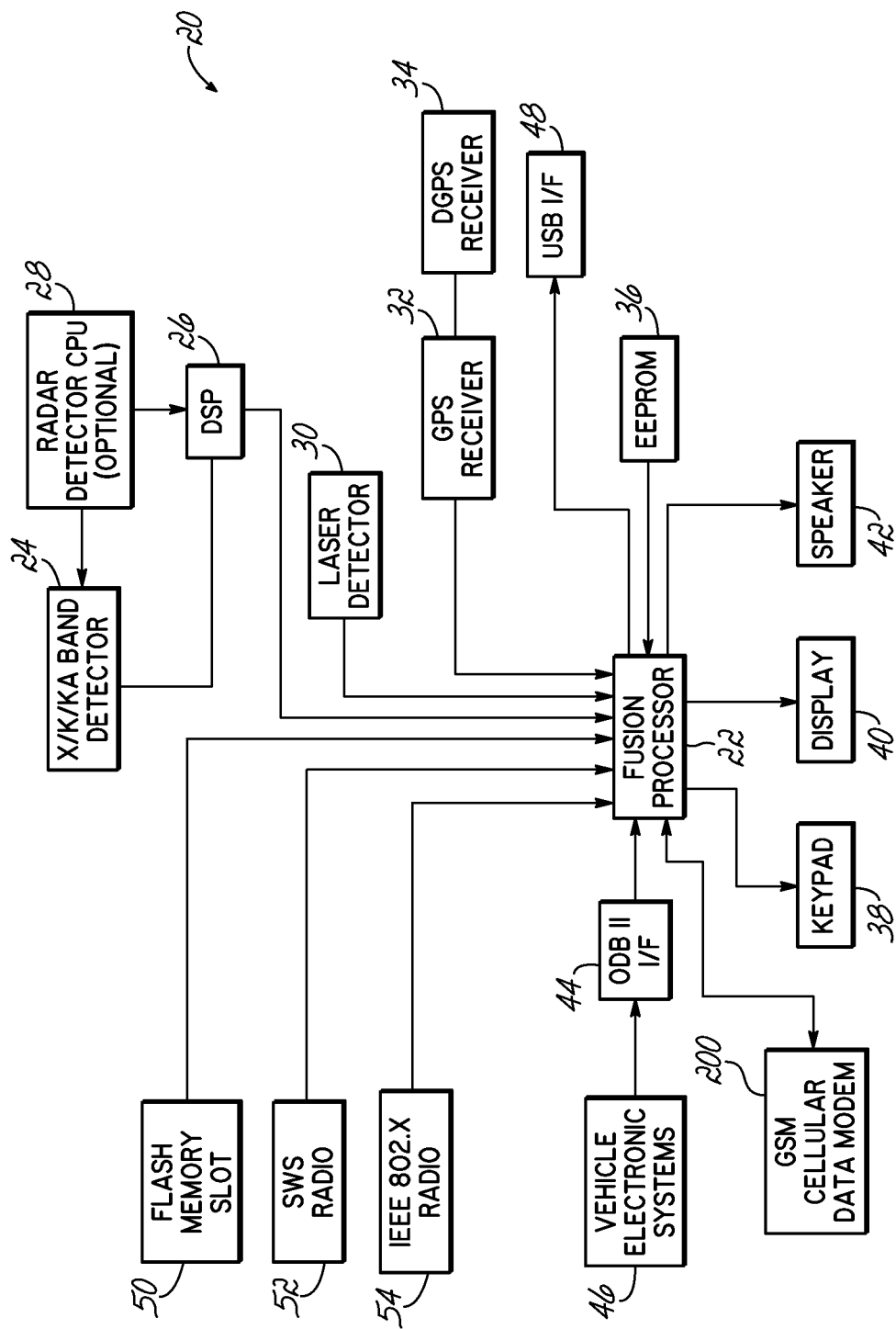
FIG. 9 is an electrical block diagram of another radar detection circuit in accordance with principles of the present invention.

Turning now to FIGS. 9-15, as many of these figures include items already discussed hereinabove in connection with FIGS. 1-8D, these discussions will not be repeated but are applicable to FIGS. 9-15 as well. In the embodiment of FIG. 9, the detector 20 includes a GSM cellular data modem 200 embedded within the detector 20 for both receiving and transmitting data, instead of an operable connection with an external mobile telephone (e.g., mobile 62 discussed in connection with FIG. 3) for receiving and transmitting data.

Those of ordinary skill in the art may appreciate that by embedding the modem 200 in the detector 20, data may be continuously transmitted from the radar detector to a server, analyzed at the server, and pooled into a master remote database on the server. In turn, the radar detector may receive pertinent updated data on coordinates, designations of coordinates (e.g., as a threat or false alert), software updates, among other data, from the remote database on the server, all in real-time, and potentially without any human interaction after the initial installation of the radar detector in the vehicle.

Indeed, the detector 20 may be able to receive real-time data about false alerts and threats without having to utilize the mobile 62 to connect the detector 20 to the server, without having to physically connect the mobile 62 to the detector 20, without having to ensure the mobile 62 is charged and operational, without having to deal with cables to connect the mobile 62 to the detector 20, without connecting the detector 20 (or part thereof) to any other device for data (e.g., software updates, data on false alert, data on threats), etc. For example, in Europe, users generally have to plug their detectors to a computer via USB to find retrieve data on the threats (e.g., data on the cameras that are on for that day), but such user intervention may be avoided or greatly reduced by the embodiments discussed herein. Furthermore, a large database at the detector 20, with data that is not updated (i.e., stale), may be avoided or at least minimized as a much smaller database and/or storage may be maintained at detector 20 with the updated data received in real-time. Moreover, the detector 20 may be updated with data that is more pertinent to the driver such as data about speed traps or false alarms or alerts within a certain radius of the detector 20 as these are positions the user is more likely to encounter then speed traps or false alerts five states away. Indeed, it may not be productive to store data for every door opener in the country as the driver will likely not be encountering such distant openers.

Turning first to the GSM cellular data modem 200 of FIG. 9, although a GSM type of cellular data modem is utilized as the modem 200, such need not be the case in other embodiments. For example, a different type modem may be utilized such as a different type of cellular data modem or bi-directional paging or any other bi-directional communications device. However, it may be beneficial to use a GSM type of cellular data modem because GSM, which stands for Global System for Mobile communications, is an international standard and a GSM cellular data modem will typically work anywhere where the GSM standard is supported (e.g., with minor adjustments such as switching a Subscriber Identity Module (hereinafter "SIM") card). However, as will be discussed further below in connection with the Jasper Wireless list, not all GSM cellular data modems in the United States function outside of the United States (e.g., due to GSM operating at different MHz in different countries). Thus, the GSM cellular data modem 200 in the detector 20 should be selected so as to function in the country where the radar detector 20 will be utilized (e.g., in the United States). Further, the detector 20 may have more than one GSM cellular data modem in some embodiments, for example, to account for these differences.

As illustrated in FIG. 9, the GSM cellular data modem 200 is coupled to the processor 22. The processor 22 generally controls all functions of the detector 20, including controlling all the functions of the modem 200 such as controlling the modem 200 to receive and/or transmit data. Under control of the processor 22, the modem 200 receives and transmits data, and the processor 22 may process the data received by the modem 200 and the processor 22 may provide data to the modem 200 for transmission. Indeed, incoming and outgoing arrows are illustrated in FIG. 9 between the modem 200 and the processor 22 to emphasize that the detector 20 is capable of two way communication such that the detector 20 may receive data through the modem 200 for the processor 22 (e.g., to store the data in the flash memory of the flash memory slot 50 or even in the EEPROM 36) and/or may transmit data of the processor 22 through the modem 200 (e.g., to the remote database 72 illustrated in FIGS. 10-12). The two way communication capability will be discussed further in connection with FIG. 10.

The processor 22 may be implemented in hardware using circuit logic disposed on one or more physical integrated circuit devices (e.g., one or more circuit boards), or chips. Although the processor 22 is illustrated as a single processor, the processor 22 may be a plurality of processors. If the fusion processor 22 is a plurality of processors, the modem 200 may be coupled, for example, to each of the processors in the plurality of processors.

Like a mobile telephone, the modem 200 may include a SIM card (not shown) with the user's subscription information and may even have a cellular phone number associated with it. The SIM card is a small removable disk that slips in and out of the GSM cellular data modem 200 and may include all the connection data and identification numbers for accessing a particular wireless service provider, such as AT&T Inc. (hereinafter "AT&T"). The modem 200 may also have a circuit-switched data (CSD) service from a wireless service provider, such as AT&T, associated with it.

The modem 200 may be from the list of certified modules and certified integrated devices at the website of Jasper Wireless, Inc. (hereinafter "Jasper Wireless") at www.jasperwireless.com. Jasper Wireless has the following contact information for its U.S. office: Jasper Wireless, Inc., 501 Macara Avenue, Suite 202, Sunnyvale, Calif. 94085, Tel: +1 408 328 5200, Fax: +1 408-328-5201. Jasper Wireless has the following contact information for its European office: Jasper Wireless, Ltd., 176 St Vincent Street, Glasgow G2 5SG, United Kingdom, Tel: +44 (0) 141 249 6780, Fax: +44 (0) 141 249 6700. The certified modules on the Jasper Wireless list, for example, may include a modem and are deployed on the Jasper Wireless Platform. Thus, the modem 200 may be a standalone modem, part of a module, part of a modified module, a device, part of a device, part of modified, etc., for example, from the Jasper Wireless list of certified modules and certified devices but need not be from the Jasper Wireless list of certified modules and certified devices. Those of ordinary skill in the art may appreciate that use of a certified module and/or certified device from the Jasper Wireless list, for example, may lead to speedier implementation of the detector 20 of FIGS. 9-15.

Specifically, for deployment in the United States, Jasper Wireless requires that modules be AT&T certified, and the Jasper Wireless list includes a variety of AT&T certified modules for deployment on the Jasper Wireless Platform, including Enfora GSM0104, GSM0108, GSM0113, GSM0204, GSM0208, GSM0304, GSM0308, and GSM0404. The list also includes certified modules of Cinterion, Ericsson, Motorola, Novatel, Option, Qualcomm, Siena Wireless, Telit, and Wavecom. Jasper Wireless also has additional modules that it has certified for deployment outside of the United States, including modules of Cinterion (Siemens), Enfora (e.g., GSM2218 and GSM 1218), Sony Ericsson, Ericsson, Sagem, SIMCom, Telit, Wavecom, and iWow. The list also includes integrated devices certified for the Jasper Wireless Platform, including integrated devices of CalAMP, Dejavoo, Digital Communications Technologies, Enfora, Falcom USA, Gemalto, Hypercom, Ingenico/Sagem, MultiTech, Noval, NovaTracker, Prolificx, Janus RemoteCommunications, Scope Logistical Solution, TechTrex, Trimble, Wavecom, and VeriFone. See http://www.jasperwireless.com/platform/certified-devices.html.

Also, u-blox America, Inc. (hereinafter "u-blox"), at www.u-biox.com, may be contacted for hardware for development. According to its website, u-blox is a fabless semiconductor provider of embedded positioning and wireless communication solutions for the consumer, industrial and automotive markets that enables people, devices, vehicles and machines to locate their exact position and wirelessly communicate via voice, text or video. The following is the contact information for the head U.S. office: u-blox America, Inc., 1902 Campus Commons Drive Suite 310, Reston, Va. 20191, USA, info_us@u-biox.com, Phone +1 (703) 483 3180, Fax +1 (703) 483 3179. U-blox has other locations around the world.

Data suppliers that may be contacted include AT&T and Juniper Networks. AT&T, at http://www.att.com/, has the following as the contact information for its headquarters: AT&T Inc., 175 E. Houston St., San Antonio, Tex. 78205. At&T has other locations around the world. Juniper Networks, at http://www.juniper.net/us/en/, has the following as the contact information for its headquarters: 1194 North Mathilda Avenue, Sunnyvale, Calif. 94089-1206 USA, Phone: 888-JUNIPER (888-586-4737), 408-745-2000, Fax: 408-745-2100. Juniper Networks has other locations around the world.

Thus, the modem 200 of the detector 20 of the embodiment of FIG. 9 may be a certified module (or modification thereof) from the Jasper Wireless list that is added to the circuit board or chip of the processor 22 for deployment on the Jasper Wireless Platform, or the hardware may be obtained from u-blox, and AT&T or Juniper may serve as the wireless service provider for the transmitting and providing data to the GSM system using GSM technology. However, those of ordinary skill in the art will appreciate that there may be other ways of implementing the detector 20 with the embedded modem 200. Indeed, u-blox also has a portfolio of GPS modules, cards, chips, and software solutions together with wireless modules and solutions, thus, those of ordinary skill in the art may appreciate that a module of u-blox (or modification thereof) or a module (or modification thereof) of some other provider, for example, may be utilized for the modem 200 instead of the certified modules from the Jasper Wireless list.

Figure 10:
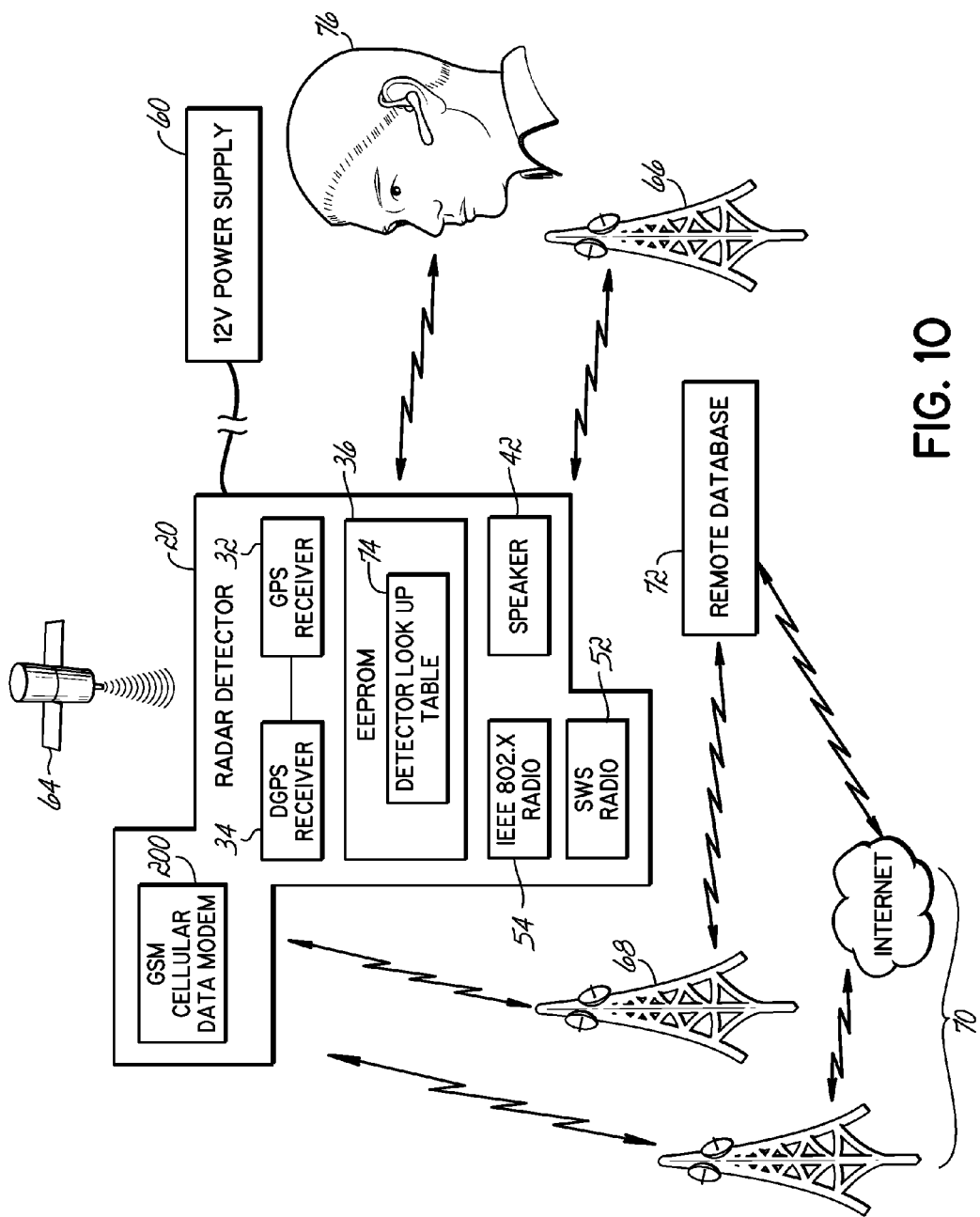
FIG. 10 is a functional block diagram of the radar detector of FIG. 9 placed within its operating environment to demonstrate possible uses.
Figure 11:
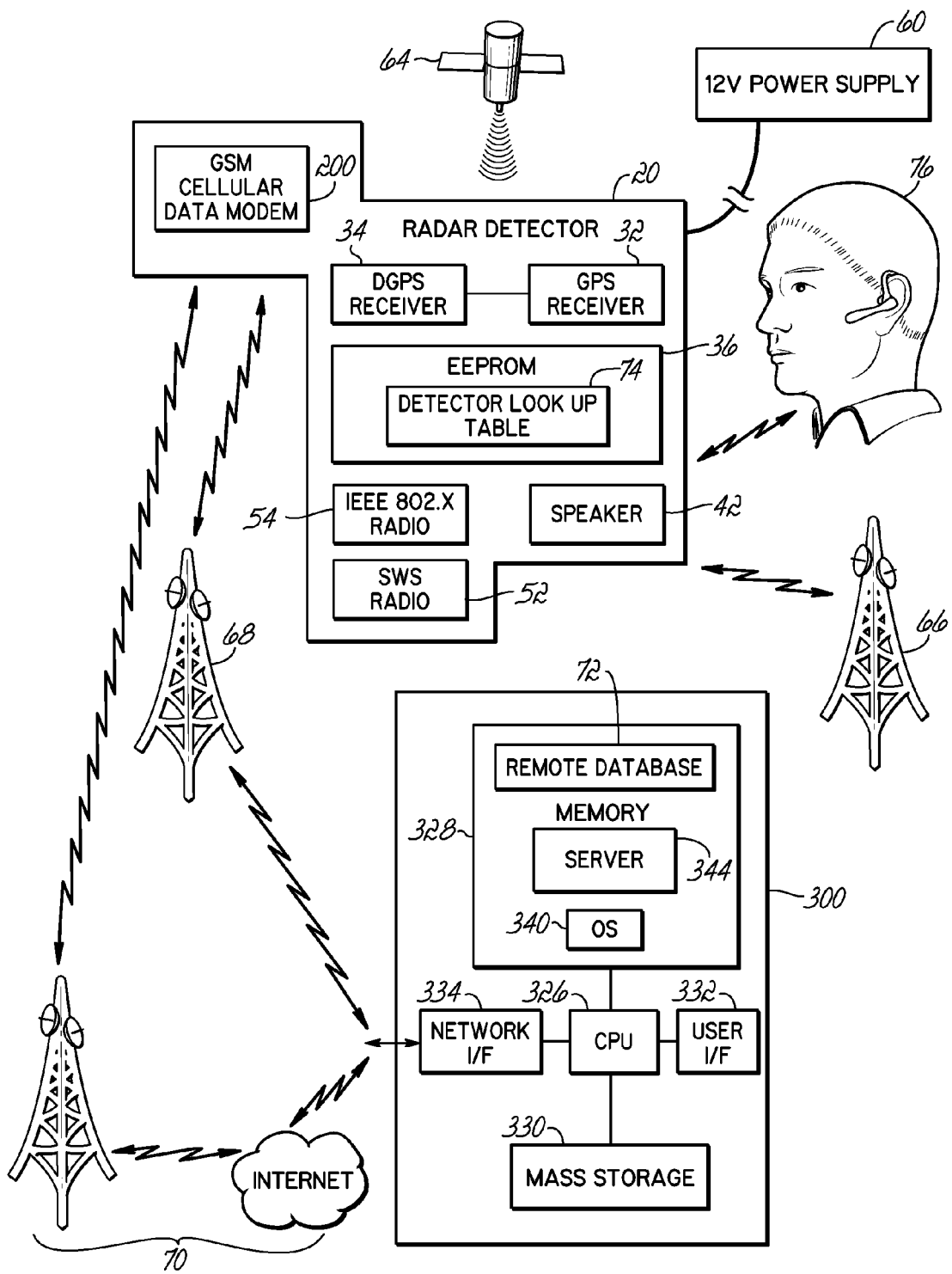
FIG. 11 is another functional block diagram of the radar detector of FIG. 9 in a client-server system or environment.

Turning to FIG. 10, this figure illustrates a block diagram of the detector 20 of FIG. 9 in a vehicle environment. Although only a single radar detector 20 is shown for simplicity in these and other figures, those of ordinary skill in the art will appreciate that multiple radar detectors 20 will generally be present in the environment. Specifically, the detector 20 includes the GSM cellular data modem 200 embedded within the detector 20 for both receiving and/or transmitting data to the remote database 72 through a communication network such as the telephone communication network 68 (e.g., GSM or CDMA2000 protocol) and/or the Internet communication network 70 (e.g., WiFi, Zigbee, EDGE, or 3G). EDGE refers to Enhanced Data rates for GSM Evolution technology, providing enhancements to GSM networks, and may use the same structure as GSM networks. As such, this may allow EDGE to be overlaid directly onto an existing GSM network (e.g., via a software-upgrade). The remote database 72 may be located at a server such as server 300 (FIG. 11). The detector 20 via the modem 200 is capable of direct real-time two way communication through the telephone communication network 68 and/or Internet communication network 70 with server 300, which contains the remote database 72. The detector 20 or various detectors 20 and the server 300 may be considered a system, and will be discussed further in connection with FIG. 11.

Specifically, the detector 20 includes the modem 200 embedded within the detector 20 for directly receiving and transmitting data, instead of an operable connection with an external mobile telephone 68 for receiving and transmitting the data (illustrated in FIG. 2 and FIG. 3). The modem 200 is capable of direct two way communication in a real-time manner through the telephone communication network 68 and/or Internet communication network 70 with the remote database 72 at the server 300. Although the term real-time is being utilized for simplicity, real-time also may include near real time, which refers to the slight delay that may be introduced by automated data processing and/or network transmission between when an event occurs and use of the processed data for display and control purposes.

As the modem 200 embedded within the detector 20 is replacing the external mobile telephone 68 that was connected to the detector 20, the modem 200 performs some or all of the functions of the mobile telephone 68. For example, the modem 200 may be responsible for converting digital data into radio signals for outgoing communication and/or converting radio signals to digital signals for incoming communication. Thus, receiving and transmitting data by the modem 200 may require conversions. To that end, the modem 200 may include a DSP (not shown) such as DSP 26, discussed in connection with FIG. 2 and FIG. 3, to carry out the conversions. Alternatively, the conversions may be performed elsewhere in the detector 20, for example, the modern 200, under control of the processor 22 (FIG. 9) may relay radio signals it receives to the DSP 26 to carry out the conversions. The modem 200 may also include an antenna (not shown) for receiving and transmitting data.

The remote database 72 at the server 300 may store transmitted GPS coordinates of an observed radar encounter or a detected radar encounter such as a speed trap transmitted by the detector 20 or other detector. As discussed above in connection with FIG. 3, an observed radar encounter is a situation when the user notices a speed trap, traffic camera, or other mechanism designed for purposes of ticket revenue or traffic deterrence instead of safety that may or may not be emitting radar. A speed trap may be defined as a location where the police enforce the speed limit. Alternatively, a speed trap may be defined as a road section where police have a reputation for writing an unusually high number of traffic tickets, the posted speed limits are not easily seen, or the speed limits are set much lower than a road engineering survey may suggest. For simplicity, these will be referred to as threats or threat designations if a user designates them as threats. On the other hand, door openers or other sources that might falsely trigger an alert will be referred to a false alerts or false alert designations if the user designates them as false alerts.

Turning to FIG. 11, FIG. 11 may be thought of as illustrative of a client-server system or environment. The client-server system or environment may include at least one client (e.g., the detector 20 may be considered a client as well as any other detectors that communicate with the server computer 300) and at least one server (e.g., the server computer 300). The system includes at least one apparatus, e.g., one or more clients in the form of the detector 20 and one or more servers in the form of the server computer 300. The computer 300 may represent practically any type of computer, computer system or other programmable electronic device capable of functioning as a server in a client-server environment. For example, in specific embodiments, the computer 300 may be a computer, computer system, computing device, disk array, or programmable device such as a multi-user computer, a single-user computer, a handheld device, a networked device (including a computer in a cluster configuration), a mobile phone, a video game console (or other gaming system), etc. Moreover, the computer 300 may be implemented using one or more networked computers, e.g., in a cluster or other distributed computing system. Further, as is common in many client-server systems, typically multiple clients (i.e., multiple detectors 20) will be interfaced with the server computer 300. However, given the nature of computer 300 as a server, in many instances computer 300 may be implemented using a multi-user computer such as a server computer, a midrange computer, a mainframe, etc. As a result, the specifications of the CPU's, memories, mass storage, user interfaces and network interfaces may vary between the computer 300 and the detector 20 to accommodate the possibly higher demands on the computer 300. Other hardware environments are contemplated within the context of the invention.

Computer 300 typically includes a central processing unit (CPU) 326 including at least one microprocessor coupled to a memory 328, which may represent the random access memory (RAM) devices comprising the main storage of computer 300, as well as any supplemental levels of memory, e.g., cache memories, non-volatile or backup memories (e.g., programmable or flash memories), read-only memories, etc. The remote database 72 may be resident in the memory 328. The CPU 326 is typically implemented in hardware using circuit logic disposed on one or more physical integrated circuit devices, or chips. Thus, the computer 300 may include at least one hardware-based processor. The CPU 326 may be one or more microprocessors, micro-controllers, field programmable gate arrays, or ASICs, while memory 328 may include random access memory (RAM), dynamic random access memory (DRAM), static random access memory (SRAM), flash memory, and/or another digital storage medium, typically implemented using circuit logic disposed on one or more physical integrated circuit devices, or chips. As such, the memory 328 may be considered to include memory storage physically located elsewhere in the computer 300, e.g., any cache memory in a processor in the CPU 326, as well as any storage capacity used as a virtual memory, e.g., as stored on a mass storage device 330 or on another computer coupled to the computer 300. The computer 300 also typically receives a number of inputs and outputs for communicating information externally. For interface with a user or operator, computer 300 typically includes a user interface 332 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal or from the modem 200 of the detector 20. Likewise, the computer 300 may output data and transmit it to the modem 200 of the detector 20.

For additional storage, the computer 300 may also include one or more mass storage devices 330, e.g., a floppy or other removable disk drive, a hard disk drive, a direct access storage device (DASD), an optical drive (e.g., a CD drive, a DVD drive, etc.), and/or a tape drive, among others. Furthermore, the computer 300 may include an interface 334 with one or more networks (e.g., a LAN, a WAN, a wireless network, the Internet (e.g., the Internet communication network 70), WiFi, Zigbee, EDGE, or 3G, a cellular or telephone network (e.g., the telephone communication network 68), GSM and/or CDMA2000 protocol, among others) to permit the communication of information with other computers, electronic devices, the radar detector 20, multiple radar detectors 20, etc. Communication through the telephone communication network 68 may be in the form of a short message through the short message service (SMS). The communication through the telephone communication network 68 may also be in the form of dual tone multi-frequency (DTMF), also known as touchtone. Indeed, the interface 334 may interface with a network that may be public and/or private, wireless and/or wired in some aspect, local and/or wide-area, represent multiple interconnected networks, etc. It should be appreciated that the computer 300 typically includes suitable analog and/or digital interfaces between the CPU 326 and each of the components 328, 330, 332 and 334 as is well known in the art.

The computer 300 operates under the control of an operating system 340, and executes or otherwise relies upon various computer software applications, components, programs, objects, modules, data structures, etc. (e.g. server 344). Moreover, various applications, components, programs, objects, modules, etc. may also execute on one or more processors in another computer coupled to computer 300 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that is used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 12:
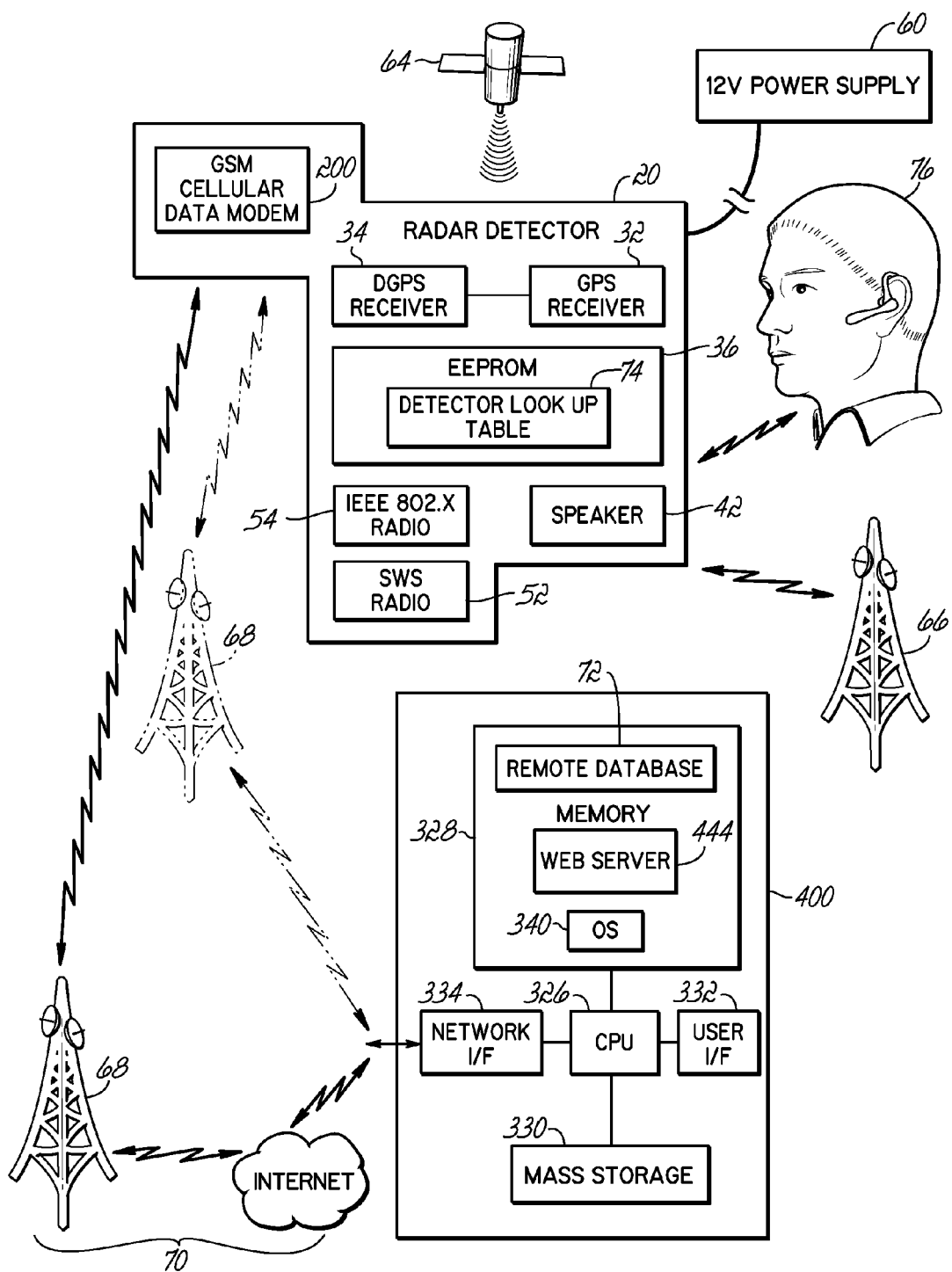
FIG. 12 is yet another functional block diagram of the radar detector of FIG. 9 in a client-server system or environment.

Furthermore, the server computer 300 may be a web server computer, such as the web server computer 400 of FIG. 12, or some other type of server computer. Turning to FIG. 12, in a similar manner to the computer 300, the web server computer 400 of FIG. 12 may include CPU 326, memory 328, mass storage 330, user interface 332, network interface 334, operating system 340, and the remote database 72 as discussed in connection with the computer 300 of FIG. 11. For example, the CPU 326 of the web server computer 400 may likewise include at least one hardware-based processor, with the CPU 326 is implemented in hardware using circuit logic disposed on one or more physical integrated circuit devices, or chips. Indeed, the CPU 326 of the web server computer 400 may be one or more microprocessors, micro-controllers, field programmable gate arrays, or ASICs, while the memory 328 of the web server computer 400 may include random access memory (RAM), dynamic random access memory (DRAM), static random access memory (SRAM), flash memory, and/or another digital storage medium, typically implemented using circuit logic disposed on one or more physical integrated circuit devices, or chips. Similarly, the remote database 72 may be resident in the memory 328 of the web server computer 400. Furthermore, the web server computer 400 operates under the control of the operating system 340, and executes or otherwise relies upon various computer software applications, components, programs, objects, modules, data structures, etc. (e.g. web server 444).

In general, the discussion hereinabove for computer 300 (FIG. 11) is applicable to the discussion of the web server computer 400, with the main difference being that the web server 444 replaces the server computer 400 to provide web-based connections. The server 344 and the web server 444 may generally be considered to include any program code resident on a computer or other programmable electronic device that is capable of servicing requests and/or analysis in a distributed computer system. Additionally, the server 344 and web server 444 may be considered to include the hardware associated with each (e.g., the computer 300 and the server computer 400, respectively) as well as the software (e.g., program code).

Additionally, with the web server computer 400, the network interface 334 of the web server computer 400 may be more likely to interface with the Internet communication network 70 instead of the telephone communication network 68. As such, the telephone communication network 68 is illustrated in phantom. However, there may be some embodiments where the network interface 334 of the web server computer 400 may still interface with both the Internet communication network 70 and the telephone communication network 68 as illustrated in FIG. 11, or simply interface with the telephone communication network 68.

Those skilled in the art will recognize that the exemplary environments illustrated in FIGS. 10-12 are not intended to limit the present invention. Indeed, those skilled in the art will recognize that other alternative hardware and/or software environments may be used without departing from the scope of the invention. For example, although a web server 44 is utilized herein, those of ordinary skill in the art will appreciate that another server and/or server computer may be utilized. Furthermore, although only a single radar detector 20 is shown for simplicity in these figures, those of ordinary skill in the art will appreciate that multiple radar detectors 20 may communicate with the server 300 and/or the web server 400, and that the server 300 and/or the web server 400 may communicate with multiple radar detectors 20.

In the context of the embodiments discussed hereinabove, the communication between the detector 20, with the embedded modem 200, and the remote database 72 of the server computer 300 and/or the web server computer 400 involves the user operatively indicating to the detector 20 that the present detection (observed or detected) should be designated as a false alert or as a threat. This may be done with a switch, remote button, or by a button located on the detector 20. Once the user operatively designates a detection as a false alert, for example, under control of the processor 22, the modem 200 of the detector 20 may communicate in real-time the particular parameters of the false alert, such as the coordinates of the false alert and data related to the coordinates such as an indication of the false alert designation, to the server computer 300 and/or the web server computer 400 to the remote database 72. The detector 20 is able to obtain the GPS coordinates of the detection by communications between satellites 64, beacons (not shown), the DGPS receiver 34 and GPS receiver 32 of the detector 20. The communication between the modem 200 and the remote database 72 may be accomplished through the telephone communication network 68 such as a GSM or CDMA2000 protocol 72 and/or accomplished through the Internet communication 70 through WiFi, Zigbee, EDGE, or 3G.

The server computer 300 and/or the web server computer 400 may analyze the received parameters from the detector 20 (and other detectors) in real-time (e.g., at the CPU 326), for example, to determine if the false alert designation at the coordinates received from the detector 20 has been received a sufficient number of times (e.g., via a counter saved in the remote database 72) from different radar detectors 20. If so, the server computer 300 and/or the web server computer 400 transmits a notification (e.g., transmitting the coordinates and perhaps an indication of the false alert designation and/or data that would mute and/or forgo alerting at the coordinates of the false alert designation) to all the radar detectors within a radius, where the coordinates of the false alert fall within that radius. Alternatively, it may transmit to those that have not designated these coordinates as a false alert within the radius. Likewise, a threat designation may be performed in a similar manner, with the server computer 300 and/or the web server computer 400 transmitting the coordinates and may also data related to the coordinates such as an indication of the threat designation. Furthermore, an indication about whether the coordinates of the location of the detector 20, the heading, and/or the speed may also be transmitted.

Regarding the radius, each radar detector may continuously transmit to the server computer 300 and/or the web server computer 400 its location (e.g., GPS coordinates), heading, and/or speed data for storage in the remote database 72, and the server computer 300 and/or the web server computer 400 may determine which radar detectors are within the radius based on the continuously received data. Regarding the remote database 72, it may serve as a master database or repository for aggregating data received from multiple radar detectors, and may include, for example, false alert designations, coordinates of false alert designations, threat designations, coordinates of threat designations, location data, including GPS coordinates, of the radar detector, heading data of the radar detector, speed data of the radar detector, counters, etc. for analysis by the server computer 300 and/or the web server computer 400 such as by the CPU 326 thereof, for example, for comparing counters to a threshold, determining radar detectors within in a radius, etc. The indications of the designations may be transmitted by either the detector 20 and/or the server 300 and/or computer 400 to reduce inaccuracies and confusion regarding why specific coordinates are being transmitted.

Thus, the detector 20 may not only transmit information to the server 300 and/or the web server 400, but it may also receive data at the embedded modem 200 from the server computer 300 and/or the web server computer 400 from the remote database 72. This data may communicate the location of false alerts or speed traps and/or threats that other detector users have observed and reported. By broadcasting the GPS coordinates through Internet communication network 70 and/or telephone communication network 68 to the modem 200 of the detector 20, the server computer 300 and/or the web server computer 400 containing the remote database 72 is able to send information to the detector 20 and others within the radius. This information may include the GPS coordinates of false alert designations and/or threat designations indicated by other detector users such that the information that is more pertinent to a driver is received at their corresponding detector. This feature can provide real time data to detector users and alert them to proceed with ease or proceed with caution. Similarly, the server computer 300 and/or the web server computer 400 may transmit software updates to the radar detectors.

All of the receive information by the modem of the radar detector 20 may be stored in the flash memory of slot 50 (FIG. 9) or even in the EEPROM 36 (FIG. 9) of the detector. Furthermore, those of ordinary skill in the art may appreciate that as real-time pertinent data will be received from the server computer 300 and/or the web server computer 400, the storage of the detector 20 may be smaller, instead of a larger storage that has out of date or stale data, and smaller storage may lead to reduction in cost and/or allow for faster searches of the storage and improve the reaction time of the detector 20. Although the inclusion of an embedded modem 200 within the detector 20 may increase the cost of the detector 20, the modem 200 may in turn lead to smaller data storage requirements.

Furthermore, it is worth noting that the radar detector 20 may also perform other tasks discussed in connection with FIGS. 1-8D such as using the coordinates of a detected signal obtained by the receivers 32, 34, the detector 20 is able to determine whether the detected signal can be correlated with a signal detected in a previous radar detection encounter. But as described herein, the radar detector 20 may further determine if data was received from the server 300 and/or the web server 400 regarding the coordinates of this detected signal and the whether a warning or alert should or should not be issued by the detector 20 via the processor 22 (FIG. 9). As such, the detector 20 and the server 300 and/or the web server 400 may be in real-time communication with each other receiving and transmitting information, without human intervention (e.g., except for the potential intervention by a user designating a false alert or a threat), that may improve accuracy and improve the experience of the user.

Figure 13:
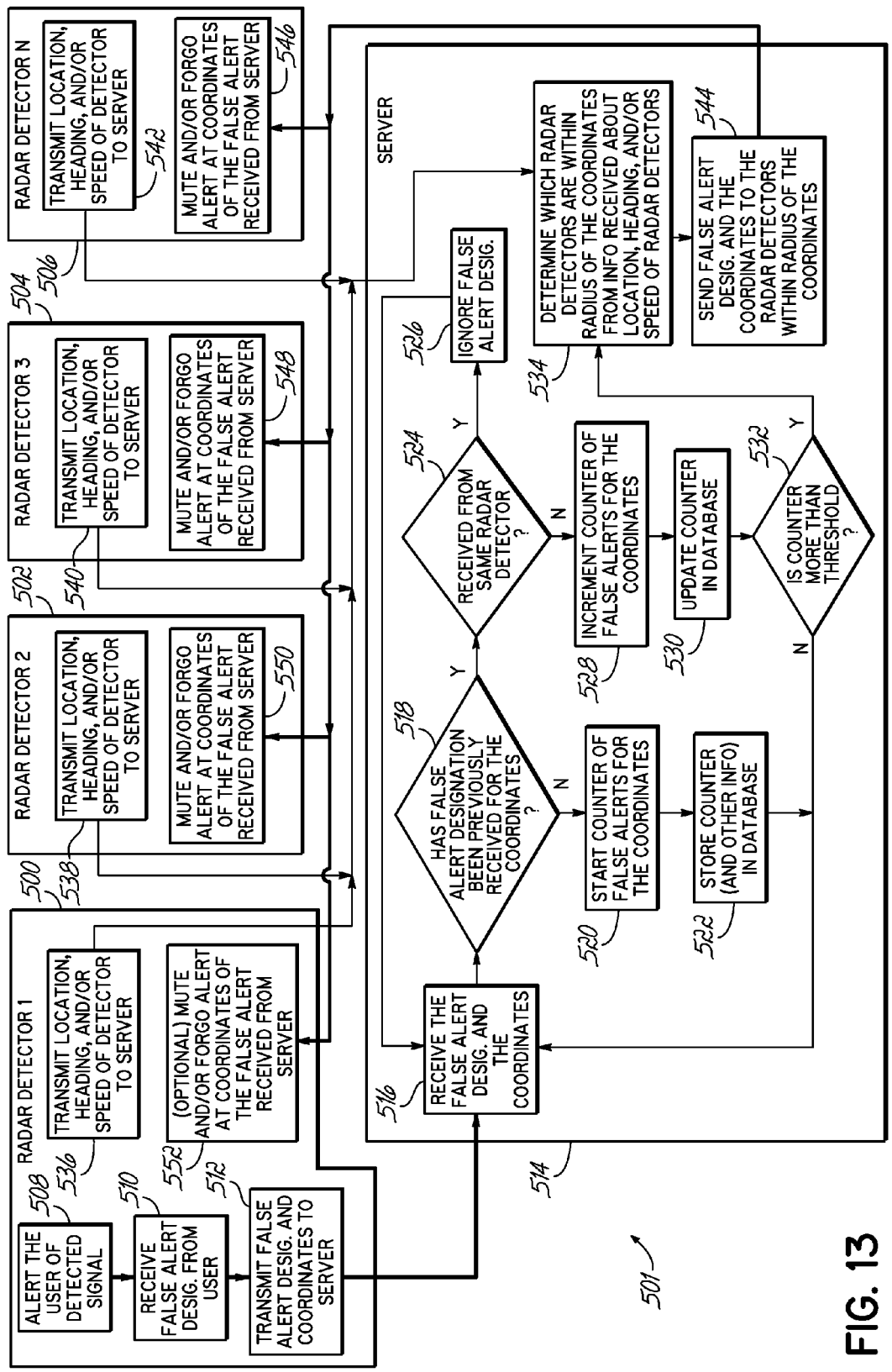
FIG. 13 is an exemplary false alert designation routine consistent with the principles of the present invention.

Turning now to FIG. 13, this figure illustrates an exemplary false alert designation routine 501 with a plurality of radar detectors 500, 502, 504, 506, with each similar to the radar detector 20, and with each having an embedded modem such as the modem 200 illustrated in FIGS. 9-12. These detectors may be in real-time two communication with server computer 514, which is similar to the server computer 300 and/or the web server computer 400. For ease of understanding, a step of the routine 501 (or a step of the other routines 601 and 701 in FIGS. 14-15) illustrated in the radar detectors 500, 502, 504, 506 or in the server computer 514 is meant to indicate that the step may be performed in that item. Although only four radar detectors are illustrated for simplicity, those of ordinary skill in the art will appreciate that many more detectors may be in real-time two way communication with the server computer 514.

Starting with block 508 in the detector 500, the detector 500 may alert the user of a detected signal. For example, the detector 500 may not have any other information on the coordinates of the detected signal or this may be the first time any of the detectors in communication with the server computer 514, including detector 500, have detected a signal at these coordinates, and as such, the detector 500 alerts the user of the detected signal. If the user learns that the detected signal is a false alert, the user may give it a false alert designation by muting the alert at block 510, and an indication of the false alert designation and the coordinates may be transmitted automatically to the server computer 514 at block 512. It is worth noting that it may be advantageous to transmit both the coordinates of the false alert designation as well as the false alert designation indication to reduce inaccuracies among all the coordinates that will be transmitted from the various detectors at various times to the server computer 514. However, in some embodiments, the false alert designation indication may be omitted and only the coordinates may be transmitted. Returning to block 510, if the user does not designate the detected signal as a false alert, then the detector 500 may simply continue to operate as usual.

Next, the server computer 514 receives the indication of the false alert designation and the coordinates at block 516, and control passes to block 518 to determine whether a false alert designation, or more specifically an indication of the false alert designation, has been previously received for the received coordinates. The terms false alert designation, an indication of the false alert designation, and false alert designation indication in the context of the server should be treated synonymously. Returning to the block 518, if not, and this is the first false alert designation indication for the coordinates, then a counter of false alerts may be started for the coordinates at block 520. As such, the server computer 514 may begin to keep track of the number of false alerts received for these coordinates. The higher the counter, the more likely it may be that the coordinates truly reflect a false alert. The counter may be stored in the remote database 72 (illustrated in FIGS. 10-11) in block 522, and control then may pass to block 516 to receive more false alert designations indications and coordinates. Other information may also be stored in the database 72 besides the counter, such as the coordinates, the false alert designation indication, as well as an identifier of the radar detector that transmitted the coordinates and the false alert designation indication. However, no data may need to be issued by the server computer 514 as a single false alert designation for the coordinates may not be very accurate.

Turning back to block 518, if a false alert designation indication has been previously received for the received coordinates, then block 524 determines whether the radar detector that transmitted the false alert designation indication just received by the server computer 514 has previously transmitted any false alert designations for these coordinates. If so, then the false alert designation just received may be ignored at block 526 as multiple false designations for the same coordinates from the same radar detector may be indicative of a user that is trying to manipulate the accuracy of the data. For example, this check is performed to reduce the chances that a single user (e.g., a police officer) or group of users will misuse their respective radar detectors to manipulate the server computer 514 into transmitting data that certain coordinates and perhaps the indication of the false alert designation which in turn would cause the detectors receiving the coordinates and false alert designation indication to not issue a warning. If the false alert data received by the detectors is a fake, it may cause users receiving those alerts at their radar detectors to receive speeding tickets at those coordinates. Further, once a user designates a detected signal as a false alert in his or her radar detector, then the radar detector will subsequently not issue a warning and mute or forgo an alert at the location, thus, there is generally no reason for the user to keep designating the same coordinates as a false alert.

Returning to block 524, if the false alert designation that was just received was not previously received from the same radar detector, then control may pass to block 528 to increment the counter of false alerts associated with these coordinates. Next, the counter is updated and stored in the database at block 530, and as another check, the updated counter is compared to a threshold at block 532. The updated counter is compared to a threshold to ensure that a sufficient number of false alert designations have been received by the server computer 514 before transmitting data to the detectors, as a low quantity of false alert designations received from radar detectors may not be as accurate. Further, use of the threshold may also help reduce the chances of a group of users, for example, using different radar detectors, from manipulation the notifications of the server computer 514. The threshold may set using statistics. For example, the selected threshold may be selected based on analysis and statistics that indicate that the selected threshold is associated with high accuracy in terms of the warnings given or not given by the radar detectors based upon the received data from the server 514. Alternatively, the selected threshold may be associated with low chances of manipulation. The threshold may be set and revised as deemed necessary (e.g., to increase accuracy and/or avoid manipulation) automatically by the server computer 514 and/or by an administrator in charge of the server computer 514.

In general, radar detectors and their users will not be able to alter the threshold so as to avoid errors and reduce the chances of manipulation. Although the checks are meant to improve accuracy and reduce the chances of manipulation, those of ordinary skill in the art will appreciate that there may still be some inaccuracies, but overall, the routine 501 (and others described herein) may improve accuracy by reducing the number of false alerts at coordinates that users are likely to encounter.

Returning to block 532, if the counter is not more than the threshold, then control may pass to block 516, without issuing a notification, for the server computer 514 to continue to receive false alert designations and coordinates. On the other hand, if the updated counter is more than the threshold, then control may pass to block 534 to determine which radar detectors are within a radius of the coordinates of the false alert designation, in other words, whether the coordinates fall within the radius of which detectors. The determination of which radar detectors are within the radius may be based on the location, heading, and/or speed data transmitted to the server computer 514 from block 536 of detector 500, block 538 of detector 502, block 540 of detector 504, and block 542 of detector 506. This information is received by the server computer 514 and utilized at block 534. This data may be continuously received from the various detectors, transmitted at specific intervals such as every ten seconds, dependant on network traffic or network speed, etc. This data may also be transmitted and received with an identifier of the corresponding radar detector to reduce inaccuracies, for example, by not attributing the data of detector 502 to detector 504. However, it may not be necessary to transmit an identifier of the corresponding radar detector, for example, if that radar detector is the only one in a certain area, then the location, heading, and/or speed data received by the server computer 514 is likely being transmitted by that detector and not another detector. Similarly, new data received that is consistent or in the same vicinity as a location, heading, and/or speed data previously received for a detector likely may mean that the new data is from that radar detector. Further, if a certain detector uniquely transmits location, heading, and/or speed data every eight seconds, for example, then location, heading, and/or speed data received every eight seconds is likely to belong to that radar detector. However, those of ordinary skill in the art may appreciate that the more radar detectors transmitting to the server computer 514, then precautions should likely be put in place (e.g., transmitting the location, heading, and/or speed and an identifier of the associated radar detector) to the server computer 514 to reduce inaccuracies.

Regarding the radius, the radius may be a couple of miles (e.g., ten miles) around the radar detectors 500, 502, 504, 506, with the radar detector in the center of the radius. As the user drives, the radius moves with the moving vehicle and the radar detector within the vehicle, and the server computer 514 transmits data regarding the coordinates of false alerts falling within that radius. The radius may be, for example, forty miles around a radar detector such that data regarding the next fifty coordinates in the forty mile radius are transmitted to the radar detector. In general, the radius may be selected such as to provide the user with enough data regarding coordinates he or she is likely to encounter so that the radar detector has up to date pertinent information, and as such, the radar detector may use smaller data storage as it is only receiving and storing data from the server computer 514 that is pertinent. Thus, receiving and storing local data regarding coordinates in the radius around the radar detector, and not wasting space and resources on data outside the radius that is likely not pertinent to the user at that time. Indeed, real-time data from the sever computer 514 may be continuously transmitted to the detectors 500, 502, 504, 506 for coordinates within the radius. However, it is worth noting that network traffic or other issues may affect how far a user drives without receiving data. Furthermore, if the server computer 514 does not need to make any notifications regarding coordinates in the radius, there may be no need for the server computer 514 to transmit data to that detector.

The exact radius may be selected based on statistics, may be dependent on network traffic or network speed or constraints, dependent on a user's particular average driving distance, dependent on the average driving distance of multiple users, dependent on the number of coordinates with data in the area, etc. For example, the radius may be an average distance driven by users based on the location, heading, and/or speed data transmitted to and received by the server computer 514. The same radius may be applied across all the radar detectors (as illustrated in FIG. 13, block 534) or different radiuses may be utilized (e.g., the radius for the detector 504 may be different than the radius utilized for detector 506).

Next, control passes to block 544 to send the false alert designation and the coordinates to the radar detectors within the radius of the coordinates. In this example, all of detectors 506, 504, 502, 500 are within the radius, and as such, each of them may be receive data from the server computer 514 at their respective embedded modem. Each modem is under control of the corresponding processor to receive the data, and the corresponding processor may not issue a warning and mute and/or forgo alerting at the coordinates of the false alert designation at blocks 546, 548, 550, 552. The received data may be stored in the flash memory of slot 50 (FIG. 9) or even the EEPROM 36 (FIG. 9) of each detector by the corresponding processor. However, as the detector 500 has already designated these coordinates as a false alert, it may not be necessary to notify detector 500 (or other detectors that also designated these coordinates as false alert based upon the data in the server 514) as the user of detector 500 is already aware of the false alert, especially since the server computer 514 may already keep track of the radar detectors for which it has received false alert designations for these coordinates. But it may be more simple to transmit data to all detectors in the radius that are in communication with the server computer 514. As such, the block 552 indicates that it is optional.

Figure 14:
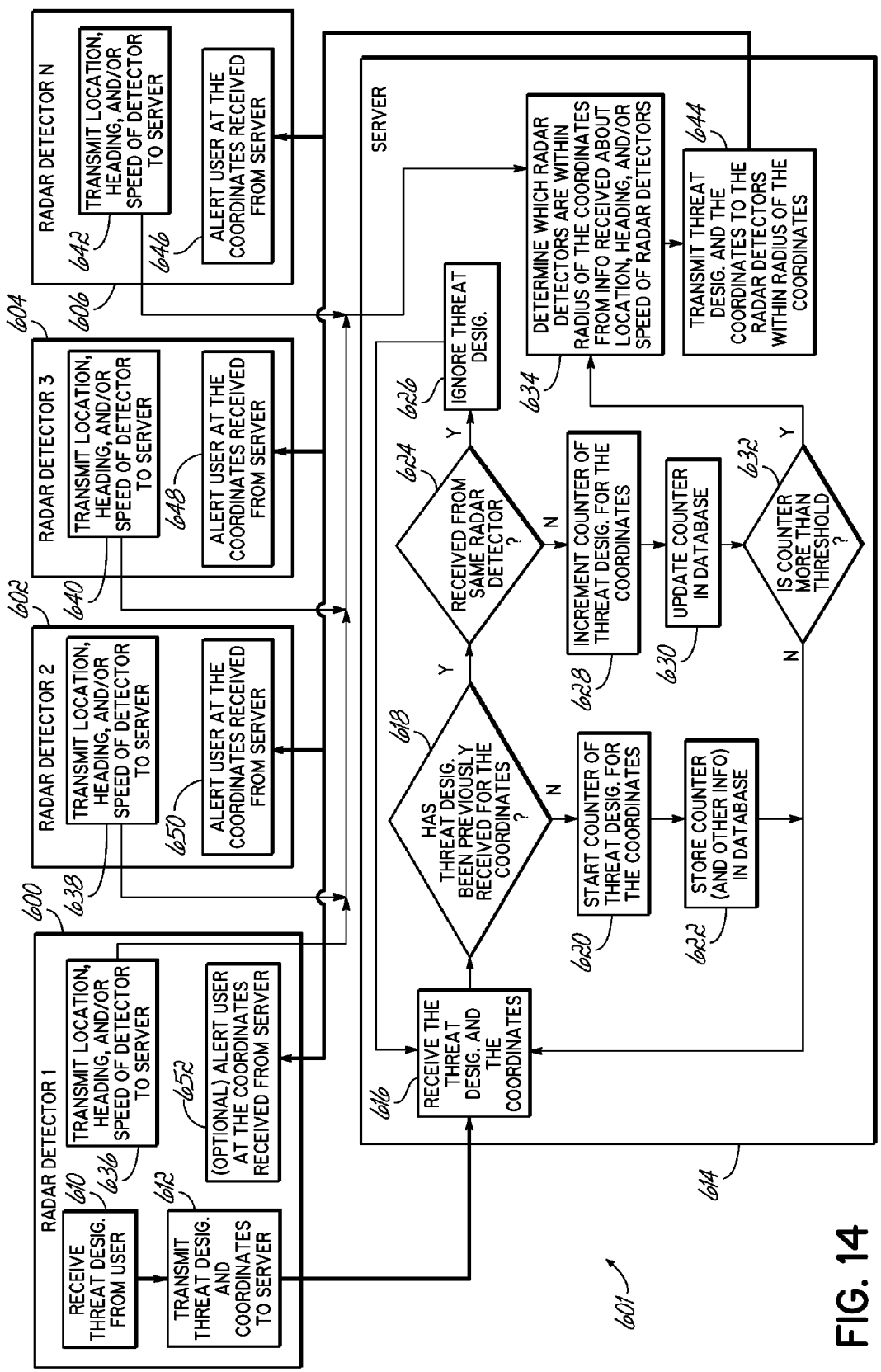
FIG. 14 is an exemplary threat designation routine consistent with the principles of the present invention.

Turning to the exemplary threat designation routine 601 of FIG. 14, this routine is similar to routine 501 of FIG. 13, and illustrates the same four radar detectors labeled as detectors 600, 602, 604, 606, akin to the detectors 500, 502, 504, 506, respectively, and the same server computer labeled as server computer 614, akin to the server computer 514. Starting with block 610, the user may give a specific position a threat designation to indicate a speed trap, camera, etc. by a switch, remote button, or by a button located on the detector, and the threat designation indication and the coordinates may be transmitted automatically to the server computer 614 at block 612. It is worth noting that it may be advantageous to transmit both the coordinates of the threat designation as well as the threat designation indication to reduce inaccuracies among all the coordinates that will be transmitted from the various detectors and received by the server computer 614. However, in some embodiments, the threat designation indication may be omitted and only the coordinates may be transmitted. Returning to block 610, if the user does not designate the detected signal as a threat, then the detector 600 may simply continue to operate as usual.

Next, the server computer 614 receives the threat designation indication and the coordinates at block 616, and control passes to block 618 to determine whether a threat designation has been previously received for the received coordinates. If not, and this is the first threat designation for the coordinates, then a counter of threats may be started for the coordinates at block 620. As such, the server computer 614 may begin to keep track of the number of threats received for these coordinates. The higher the counter, the more likely it may be that the coordinates truly reflect a threat. The counter may be stored in the remote database 72 (illustrated in FIGS. 10-11) in block 622, and control then may pass to bock 516 to receive more threat designations and coordinates. Other information may also be stored in the database 72 including the coordinates, the threat designation indication, as well as an identifier of the radar detector that transmitted the coordinates and the threat designation indication. However, no data may need to be issued by the server computer 614 to any of the detectors as a single threat designation for the coordinates may not be very accurate.

Returning back to block 618, if a threat designation has been previously received for the received coordinates, then block 624 determines whether the radar detector that transmitted the threat designation just received by the server computer 614 has previously transmitted any threat designations for these coordinates. If so, then the threat designations just received may be ignored at block 626 as multiple threat designations for the same coordinates from the same radar detector may be indicative of a user that is trying to manipulate the accuracy of the data.

Returning to block 624, if the threat designation that was just received was not previously received from the same radar detector, then control may pass to block 628 to increment the counter of threats associated with these coordinates. Next, the counter is updated and stored in the database at block 630, and as another check, the updated counter is compared to a threshold at block 632.

Returning to block 632, if the counter is not more than the threshold, then control may pass to block 616, without issuing a notification, for the server computer 614 to continue to receive threat designations and coordinates. On the other hand, if the updated counter is more than the threshold, then control may pass to block 634 to determine which radar detectors are within a radius of the coordinates of the threat designation. The determination of which radar detectors are within the radius is based on the location, heading, and/or speed data transmitted to the server computer 614 from block 636 of detector 600, block 638 of detector 602, block 640 of detector 604, and block 642 of detector 606. This information is received by the server computer 614 and utilized at block 634.

Next, control passes to block 644 to send the threat designation and the coordinates to the radar detectors within the radius of the coordinates. In this example, all of detectors 606, 604, 602, 600 are within the radius, and as such, each of them may be receive at their respective embedded modems data from the server computer 614. Each modem is under control of the processor to receive the data, and each processor may issue a warning to alert the user at the coordinates of the threat designation at blocks 646, 648, 650, 652, respectively. The received data may be stored in the flash memory of slot 50 (FIG. 9) or even the EEPROM 36 (FIG. 9) of each detector. However, as the detector 600 has already designated these coordinates as a threat, it may not be necessary to notify detector 600 (or other detectors that also designated these coordinates as threat) as the user of detector 600 is already aware of the threat, especially since the server computer 614 may already keep track of the radar detectors for which it has received threat designations for these coordinates. But it may be more simple to transmit the data to all detectors in the radius that are in communication with the server computer 614. As such, the block 652 indicates that it is optional.

Furthermore, in each of the transmission between from a detector to the server or from the server to the detector it may be advantageous to also transmit some data related to the coordinates and not just simply the coordinates to reduce inaccuracies, but the coordinates alone may be transmitted. Indeed, as the server computer 514, 614 may be receiving coordinates associated with different events such as false designations, threat designations, and the continuous location data of each detector, it may be advantageous for the detectors, and specifically the modems embedded therein, to transmit data related to the coordinates, for example, such as an indication of the type of the event associated with the transmitted coordinates to reduce inaccuracies. Likewise, it may be advantageous for the server computer 514, 614 to transmit its data with at least an indication of the type of the event (e.g., threat designation or false alert designation) associated with the transmitted coordinates to reduce inaccuracies. For example, it may be beneficial to also transmit an identifier of the detector with the heading data or the speed data, for example, However, transmitting an indication of the event connected with the transmitted coordinates may not be necessary in some embodiments, for example, if the event can be deduced.

Further, it is worth noting that although various checks are included in routine 601 and 501 (FIG. 13) to reduce inaccuracies and limit manipulation, some or all the checks may be omitted in some embodiments. In such cases, the detectors, with their embedded modems, may be in real-time two way communication with the server computer and simply receive and transmit data without the checks.

Figure 15:
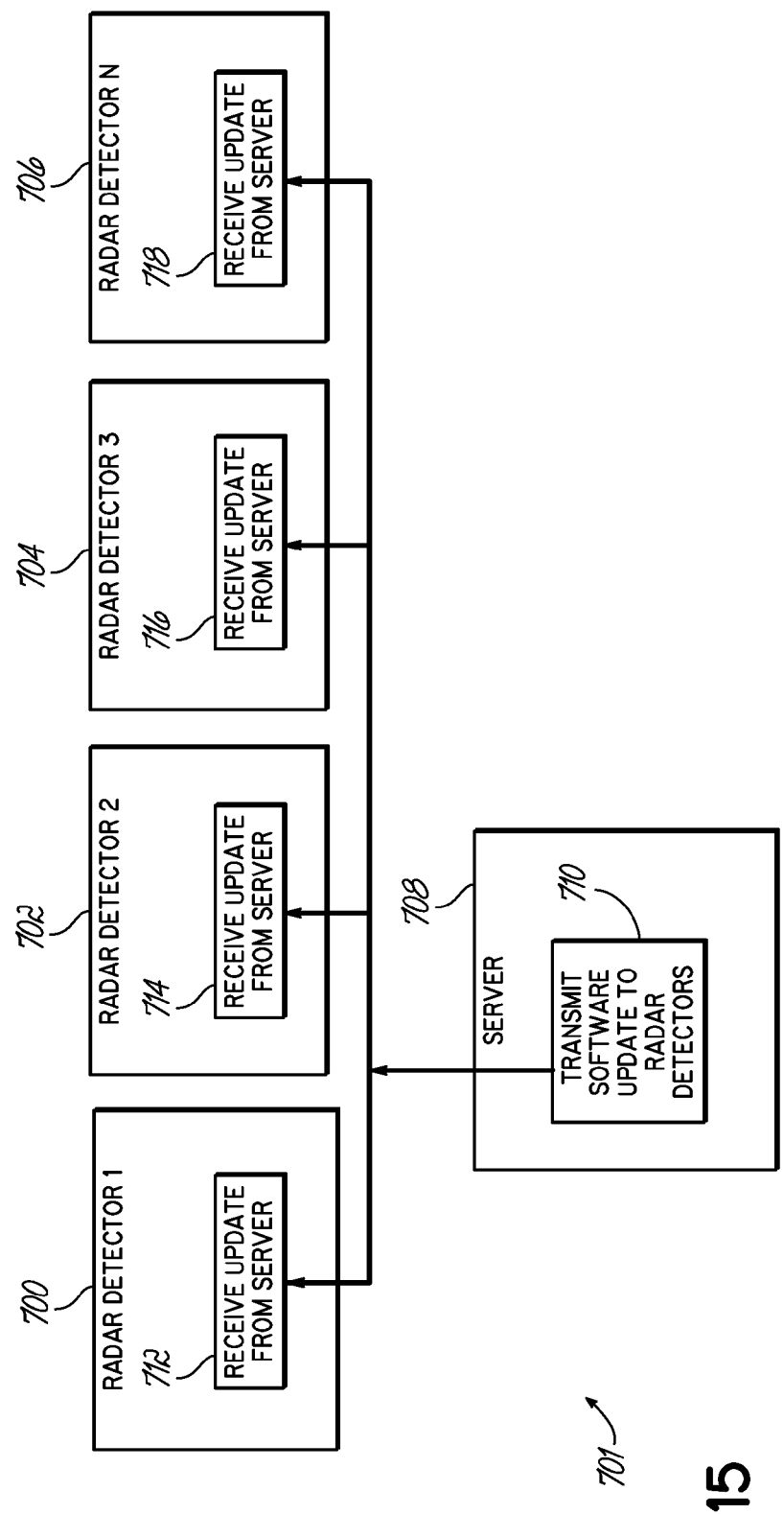
FIG. 15 is an exemplary update routine consistent with the principles of the present invention.

Turning to the exemplary update routine 701 of FIG. 15, this routine illustrates the same four radar detectors labeled as detectors 700, 702, 704, 706, akin to the radar detectors 500, 502, 504, 506 of FIG. 13 and the radar detectors 600, 602, 604, 606 of FIG. 14, respectively, and the same server computer labeled as server computer 708, akin to the server computer 514 of FIG. 13 and the server computer 614 of FIG. 14. Specifically, the server computer 708 may transmit a software update to the radar detectors 700, 702, 704, 706 at block 710. In particular, the software update may be transmitted from the remote database of the server, under control of the processor of the server 614, to each radar detector in communication with the server computer 708, and if a radar detector is turned off, for example, the update may be transmitted once that radar detector is turned on and communicating with the server computer 708. Next, the software update is received from the server computer 710 by the embedded modem within each of detected 700, 702, 704, 706, specifically, received at block 712 of detector 700, block 714 of detector 702, block 716 of detector 704, and block 718 of detector 706. The updates may be stored in the flash memory of slot 50 (FIG. 9) or even the EEPROM 36 (FIG. 9) of each detector. Each modem is under control of the processor of the detector to receive the software updates, and the processors implement the updates.

As such, software updates or other types of updates (e.g., firmware upgrades) may be automatically transmitted, in real-time, from the server computer 708 to each of detectors 700, 702, 704, 706 without any user intervention. For example, the user may have his or her detector automatically updated without having to manually remove the radar detector from the vehicle and manually connect it to a computer (e.g., via USB), which may be cumbersome and/or impractical for some users (e.g., elderly users), and without having to manually insert software updates in any manner. Thus, instead of forgoing software updates due to the inconvenience or difficulties that may arise with manual updates, the routine 701 may be utilized to automatically update the radar detectors in real-time as often as needed without user intervention.

Additionally, it is worth noting that the routines 501, 601, and/or 701 may be utilized in conjunction with each other. For example, the radar detector 500, 600 may be utilized to both transmit false alert designations and threat designations, along with the coordinates of these. Indeed, those of ordinary skill in the art will appreciate that often times the status of some coordinates may constantly change, for example, if the police officer is at a position, then users may designate it as a threat, and after exceeding the threshold, the server computer may transmit the notification of the threat designation with the coordinates. However, if the police officer leaves those coordinates, then users may designate it as a false alert, and after exceeding the threshold, the server computer may transmit the notification of the false alert designation with the coordinates. Furthermore, at about the same time, a software update may be transmitted to the detector 500, 600. Alternatively, the opposite may occur with the false alert designation first and then the threat designation second. Thus, although the routines 501, 601, 701 are illustrated as separate routines for simplicity, the routines may be utilized cooperatively on the four detectors and the server.

It will be appreciated that the embodiments illustrated above are exemplary and not limiting, and that other embodiments of the present invention fall within the scope of the appended claims. For example, the features shown in the power cord assembly may be integrated into an under-dash unit rather than a housing coupled to the power plug. The vehicle's built-in electronics may also incorporate any or all of the functions described. In some embodiments, for example, the detector 20 may have both the embedded GSM cellular data modem 200 and also be in operable connection with the external mobile telephone 62 (FIG. 2).

The invention is thus not limited to the embodiments disclosed but is defined by the following claims.

The invention claimed is:

1. A police activity warning system, comprising:
   (a) a police activity radar detector, comprising:
      a receiver for detecting electromagnetic signals generated in the context of police activity,
      a global positioning receiver operable to provide coordinates for a first position;
      a modem operable to wirelessly transmit at least the coordinates of the first position and additional data to a server external to the detector;
      at least one hardware based processor coupled to the global positioning receiver and coupled to the modem;
      the processor operable to generate an alert of detection of electromagnetic signals by said detector, and in response thereto obtain from a user input upon the nature of the alert, obtain the coordinates of the first position from the global position receiver, and control the modem to wirelessly transmit at least the coordinates obtained from the global positioning receiver and user input on the alert to the server that is external to the detector; and
      the processor of the detector operable to control the modem to wirelessly receive at least coordinates of a second position from the server, and wherein the processor is operable to determine whether a warning should be issued in response to at least the received coordinates for the second position; and
   (b) the server external to the detector, comprising:
      at least one hardware based processor operable to transmit at least coordinates for the second position to the modem of the detector; and
      a database storing at least the coordinates of the second position.

2. The system of claim 1, wherein the processor of the detector is operable to receive a characterization of the first position as a speed trap from a user of the detector.

3. The system of claim 2, wherein the processor of the detector is coupled to said receiver, and wherein the processor is operable to evaluate electromagnetic signals received by said receiver to determine whether a warning is to be issued, the processor operating under control of software and/or data.

4. The system of claim 1, wherein the processor of the detector is further operable to determine if there is data related to the coordinates of the first position from the global positioning receiver, and wherein the processor is further operable to control the modem of the detector to wirelessly transmit data related to the coordinates of the first position to the server that is external to the detector.

5. The system of claim 4, wherein the modem of the detector is operable to wirelessly transmit the data related to the coordinates of the first position to the server external to the detector in real-time.

6. The system of claim 4, wherein the processor of the detector is further operable to determine if the coordinates of the first position from the global positioning receiver are designated as a false alert, and wherein the processor is further operable to control the modem of the detector to wirelessly transmit an indication of the false alert designation to the server that is external to the detector if the coordinates of the first position have been designated as a false alert.

7. The system of claim 6, wherein the processor of the detector is further operable to receive the false alert designation from a user of the detector, and wherein the processor is further operable to determine that the coordinates of the first position are designated as a false alert based on the false alert designation received from the user.

8. The system of claim 6, wherein the modem of the detector is operable to wirelessly transmit the indication of the false alert designation for the coordinates of the first position to the server external to the detector in real-time.

9. The system of claim 4, wherein the processor of the detector is further operable to determine if the coordinates of the first position from the global position receiver are designated as a threat, wherein the indication of the threat designation is data related to the coordinates of the first position, and wherein the processor is further operable to control the modem of the detector to wirelessly transmit an indication of the threat designation to the server that is external to the detector if the coordinates of the first position have been designated as a threat.

10. The system of claim 9, wherein the processor of the detector is operable to receive the threat designation from a user of the detector, and wherein the processor is further operable to determine that the coordinates of the first position are designated as a threat based on the threat designation received from the user.

11. The system of claim 9, wherein the modem of the detector is operable to wirelessly transmit the indication of the threat designation for the coordinates of the first position to the server external to the detector in real-time.

12. The system of claim 1, wherein the modem of the detector is operable to wirelessly transmit at least the coordinates of the first position to the server external to the detector in real-time.

13. The system of claim 1, wherein the first position is that of the detector.

14. The system of claim 1, wherein the processor of the detector is further operable to obtain at least heading data for the detector from the global positioning receiver, and wherein the processor is further operable to control the modem of the detector to wirelessly transmit the heading data obtained from the global positioning receiver to the server that is external to the detector.

15. The system of claim 14, wherein the modem of the detector is operable to wirelessly transmit the heading data to the server external to the detector in real-time.

16. The system of claim 1, wherein the processor is further operable to obtain at least speed data for the detector from the global positioning receiver, and wherein the processor is further operable to control the modem of the detector to wirelessly transmit the speed data obtained from the global positioning receiver to the server that is external to the detector.

17. The system of claim 16, wherein the modem of the detector is operable to wirelessly transmit the speed data to the server external to the detector in real-time.

18. The system of claim 1, wherein the processor of the detector is further operable to obtain an identifier of the detector, the identifier identifying the detector from among a plurality of detectors, and wherein the processor is further operable to control the modem of the detector to wirelessly transmit the identifier of the detector to the server that is external to the detector.

19. The system of claim 18, wherein the modem of the detector is operable to wirelessly transmit the identifier of the detector to the server external to the detector in real-time.

20. The system of claim 1, wherein the modem of the detector is a cellular telephone used as a tethered data modem.

21. The system of claim 1, wherein the modem of the detector is a cellular smartphone used as a tethered data modem.

22. The system of claim 1, wherein the second position was selected by a user that did not select the first position, and wherein the second position was received by the server.

23. The system of claim 1, wherein the second position is about the same as the first position, and wherein the coordinates of the second position are about the same as the coordinates of the first position.

24. The system of claim 1, wherein the processor is further operable to control the modem to wirelessly receive data related to the coordinates of the second position from the server that is external to the detector, and wherein the processor is operable to determine whether a warning should be issued in response to the received data related to the coordinates for the second position.

25. The system of claim 24, wherein the modem is further operable to wirelessly receive from the server external to the detector an indication of a false alert designation for the coordinates of the second position, wherein the indication of the false alert designation is data related to the coordinates of the second position, and wherein the processor is further operable to control the modem to wirelessly receive the indication.

26. The system of claim 25, wherein the processor is operable to determine that a warning should not be issued for the coordinates of the second position in response to the received indication of the false alert designation.

27. The system of claim 25, wherein the modem of the detector is operable to wirelessly receive the indication of the false alert designation for the coordinates of the second position from the server external to the detector in real-time.

28. The system of claim 24, wherein the modem is further operable to wirelessly receive from the server external to the detector an indication of a threat designation for the coordinates of the second position, wherein the indication of the threat designation is data related to the coordinates of the second position, and wherein the processor is further operable to control the modem to wirelessly receive the indication.

29. The system of claim 28, wherein the processor is operable to determine that a warning should be issued for the coordinates of the second position in response to the received indication of the threat designation.

30. The system of claim 28, wherein the modem of the detector is operable to wirelessly receive the indication of the threat designation for the coordinates of the second position from the server external to the detector in real-time.

31. The system of claim 1, wherein the processor of the server is further operable to transmit to the modem of the detector the coordinates of the second position based upon a condition.

32. The system of claim 31, wherein the processor of the server is operable to determine whether to if the coordinates of the second position if the second position are within a radius of the detector, and the processor is further operable to transmit to the modem of the detector the coordinates of the second position if the coordinates of the second position are within a radius of the detector.

33. The system of claim 31, wherein the processor is further operable to transmit to the modem of the detector the coordinates of the second position in response to a counter.

34. The system of claim 31, wherein the processor is further operable to transmit to the modem of the detector the coordinates of the second position based upon whether the detector previously transmitted the coordinates of the second position to the server.

35. The system of claim 1, wherein the processor of the server is operable to transmit to the modem of the detector a software update, and wherein the processor of the detector is operable to control the modem to receive from the server the software update.

36. The system of claim 35, wherein the processor of the detector is operable to implement the software update received by the modem from the server.

37. The system of claim 1, further comprising a plurality of radar detectors, wherein each modem of each detector in the plurality of detectors is operable to transmit data to the server and operable to receive data from the server.

38. The system of claim 37, wherein the processor of the server is operable to transmit to each modem of each detector in the plurality of detectors a software update, and wherein each processor of each of detector in the plurality of the detectors is operable to control each modem to receive from the server the software update.

39. The system of claim 38, wherein each processor of each detector is operable to implement the software update received by the corresponding modem from the server.

40. A police activity warning system, comprising
a modem operable to wirelessly receive at least coordinates of a position from a server external to the warning system;
at least one hardware based processor coupled to the modem; and
the processor operable to control the modem to wirelessly receive at least coordinates of an alert generated external to the warning system system, and user input on the alert, from the server and wherein the processor is operable to determine whether a warning should be issued in response to at least the received coordinates and user input.

41. The warning system of claim 40, wherein the modem is operable to also wirelessly receive data related to the coordinates from the server external to the warning system; and
the processor is operable to control the modem to wirelessly receive the data related to the coordinates and user input from the server that is external to the warning system, and wherein the processor is operable to determine whether a warning should be issued in response to the received data related to the coordinates.

\* \* \* \* \*